United States Patent
Yamauchi et al.

(10) Patent No.: US 9,549,412 B2
(45) Date of Patent: Jan. 17, 2017

(54) SCHEDULING METHOD AND TASK PROCESSING METHOD

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 14/057,857

(22) Filed: Oct. 18, 2013

(65) Prior Publication Data

US 2014/0045512 A1    Feb. 13, 2014

Related U.S. Application Data

(63) Continuation of application No. PCT/JP2011/059572, filed on Apr. 18, 2011.

(51) Int. Cl.
*H04W 72/08*    (2009.01)
*G06F 9/50*    (2006.01)

(52) U.S. Cl.
CPC .......... *H04W 72/085* (2013.01); *G06F 9/5044* (2013.01); *G06F 2209/501* (2013.01)

(58) Field of Classification Search
CPC ....... H04W 24/08; H04W 28/08; H04W 72/08
USPC ................... 455/452.2, 456.1, 574; 370/338
See application file for complete search history.

(56) References Cited

U.S. PATENT DOCUMENTS

2006/0089997 A1    4/2006 Inokuchi
2012/0236779 A1*    9/2012 Lee .................. H04W 8/186
                                                370/312

FOREIGN PATENT DOCUMENTS

| JP | 8-79269 | 3/1996 |
| JP | 2004-88200 | 3/2004 |
| JP | 2004-302741 | 10/2004 |
| JP | 2006-79389 | 3/2006 |
| JP | 2006-126894 | 5/2006 |
| JP | 2006-201896 | 8/2006 |
| JP | 2006-252218 | 9/2006 |
| JP | 2007-241394 | 9/2007 |
| JP | 2008-077281 | 4/2008 |
| JP | 2009-140224 | 6/2009 |

OTHER PUBLICATIONS

International Search Report mailed Jun. 28, 2011 in corresponding International Application No. PCT/JP2011/059572.

(Continued)

*Primary Examiner* — Sam Bhattacharya
(74) *Attorney, Agent, or Firm* — Staas & Halsey LLP

(57) ABSTRACT

A scheduling method is executed by a first apparatus among a plurality of apparatuses. The scheduling method includes assigning a process to at least one apparatus among the apparatuses based on a first table that includes each communication strength of the apparatuses; receiving an execution result of the process and a communication strength from the at least one apparatus; and creating the first table based on the received communication strength.

10 Claims, 21 Drawing Sheets

(56) References Cited

OTHER PUBLICATIONS

International Preliminary Report on Patentability issued Oct. 31, 2013 in corresponding International Patent Application No. PCT/JP2011/059572.
Japanese Office Action issued Dec. 16, 2014 in Japanese Patent Application No. 2013-510764.
Japanese Office Action dated Apr. 7, 2015 in corresponding Japanese Patent Application No. 2013-510764.

* cited by examiner

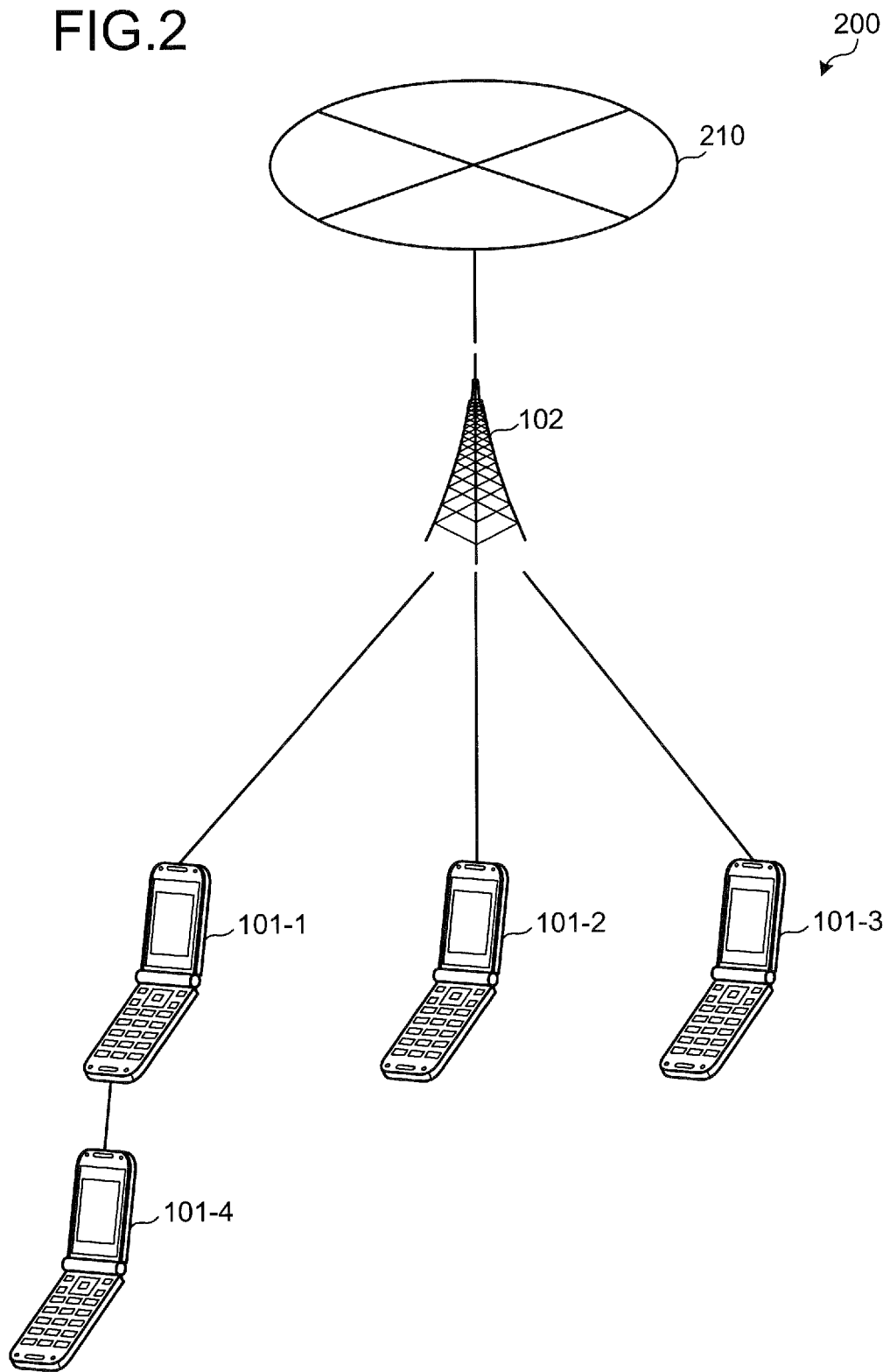

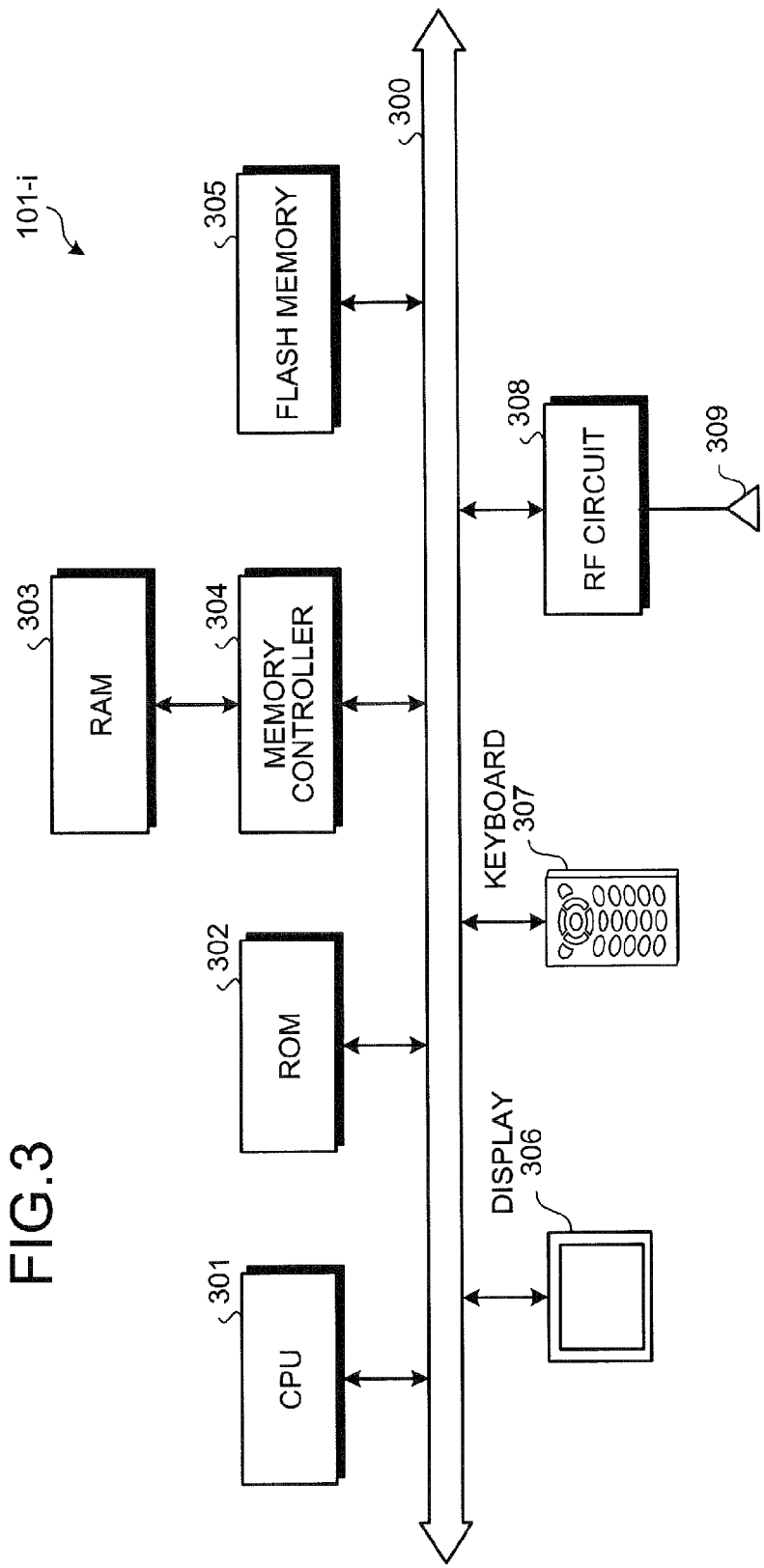

FIG.16

TERMINAL APPARATUS INFORMATION TABLE 400

| TERMINAL APPARATUS ID | COMMUNI-CATION STRENGTH Sti | COMMUNI-CATION SPEED Spi | DATA RATIO | PROCESS ASSIGNMENT AVAILABILITY FLAG |
|---|---|---|---|---|
| #1 | 60% | 10 Mbps | 100 | ON |
| #2 | 50% | 10 Mbps | 100 | ON |
| #3 | 90% | 1 Mbps | 11 (10+1) | ON |
| #4 | 18% | 100 kbps | 1 | ON |

400-1
400-2
400-3
400-4

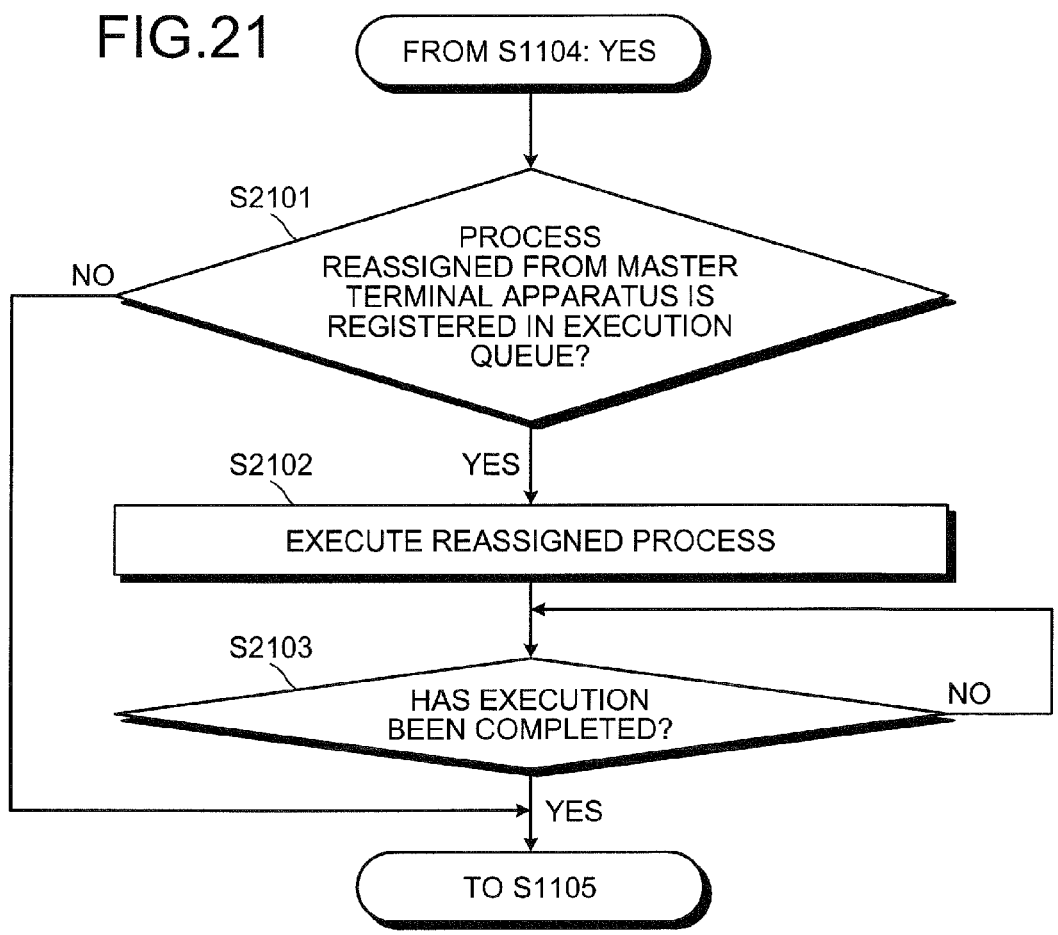

SCHEDULING METHOD AND TASK PROCESSING METHOD

CROSS REFERENCE TO RELATED APPLICATIONS

This application is a continuation application of International Application PCT/JP2011/059572, filed on Apr. 18, 2011 and designating the U.S., the entire contents of which are incorporated herein by reference.

FIELD

The embodiments discussed herein are related to a scheduling method and a task processing method.

BACKGROUND

A technique called grid computing is conventionally known that includes sharing data among multiple terminal apparatuses capable of communication and executing a process using the data with the multiple terminal apparatuses. For example, the terminal apparatuses may be mobile telephones, personal digital assistants (PDAs), and notebook personal computers (PCs).

In the grid computing, the process using shared data may be executed by multiple terminal apparatuses to distribute resulting load. For examples, refer to Japanese Laid-Open Patent Publication Nos. 2009-140224, 2006-126894, 2006-79389, and H8-79269.

However, with the conventional technique, a problem arises in that the process may not be completed consequent to termination resulting from deterioration of the communication state of a terminal apparatus. For example, if the communication state deteriorates at a terminal apparatus executing a process, the process result obtained by the terminal apparatus cannot be synchronized with the other terminal apparatuses and therefore, the overall process cannot be completed.

SUMMARY

According to an aspect of an embodiment, a scheduling method that is executed by a first apparatus among a plurality of apparatuses, includes assigning a process to at least one apparatus among the apparatuses based on a first table that includes each communication strength of the apparatuses; receiving an execution result of the process and a communication strength from the at least one apparatus; and creating the first table based on the received communication strength.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an explanatory view of an example of a scheduling system according to the first embodiment;
FIG. 3 is a block diagram of a hardware example of a terminal apparatus according to the first embodiment;
FIG. 16 is an explanatory view of an example of the contents of the terminal apparatus information table of a third embodiment;
FIG. 21 is a flowchart of an example of a reassignment execution process procedure of the slave terminal apparatus according to the third embodiment.

DESCRIPTION OF EMBODIMENTS

Embodiments of a scheduling method and a task processing method will be described in detail with reference to the accompanying drawings.

A first embodiment of the scheduling method and the task processing method will be described. In the first embodiment, among m (m>1) terminal apparatuses sharing data, a terminal apparatus selected based on communication strength between the terminal apparatuses and a base station is assigned a process that uses data shared by the m terminal apparatuses. As a result, even if communication is interrupted at a terminal apparatus among the multiple terminal apparatuses, the process using the shared data can be continued and completed.

Figure 1A:
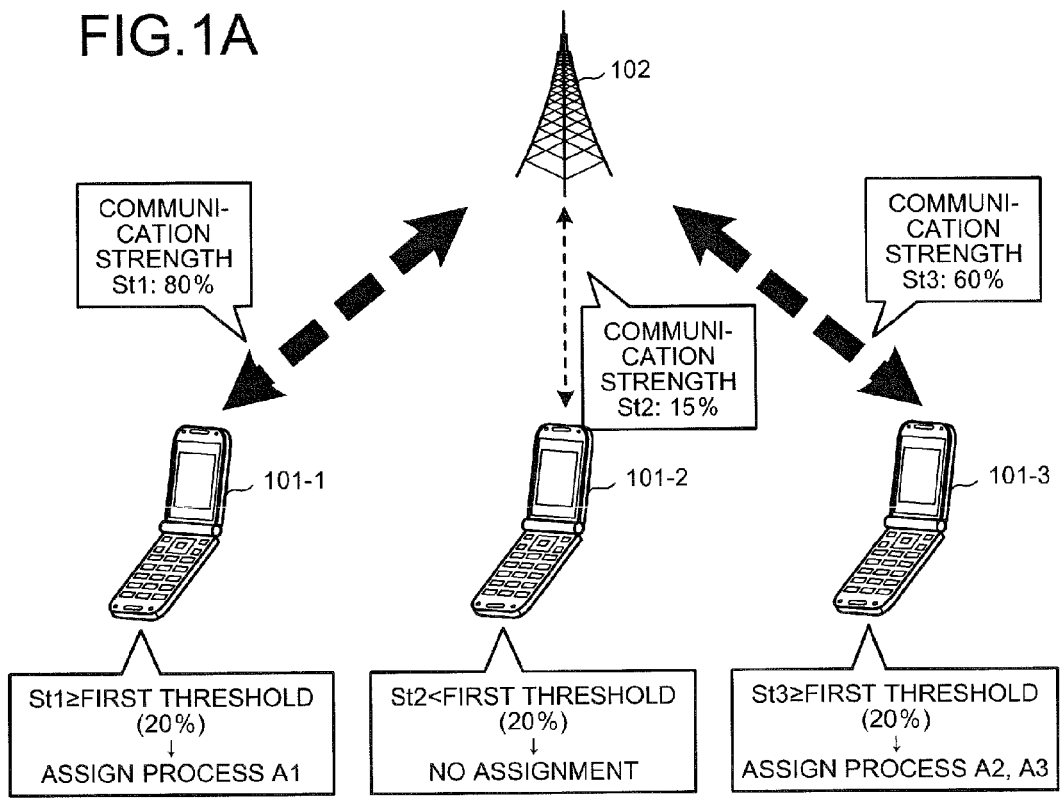
FIGS. 1A and 1B are explanatory views of scheduling examples according to a first embodiment.
Figure 1B:
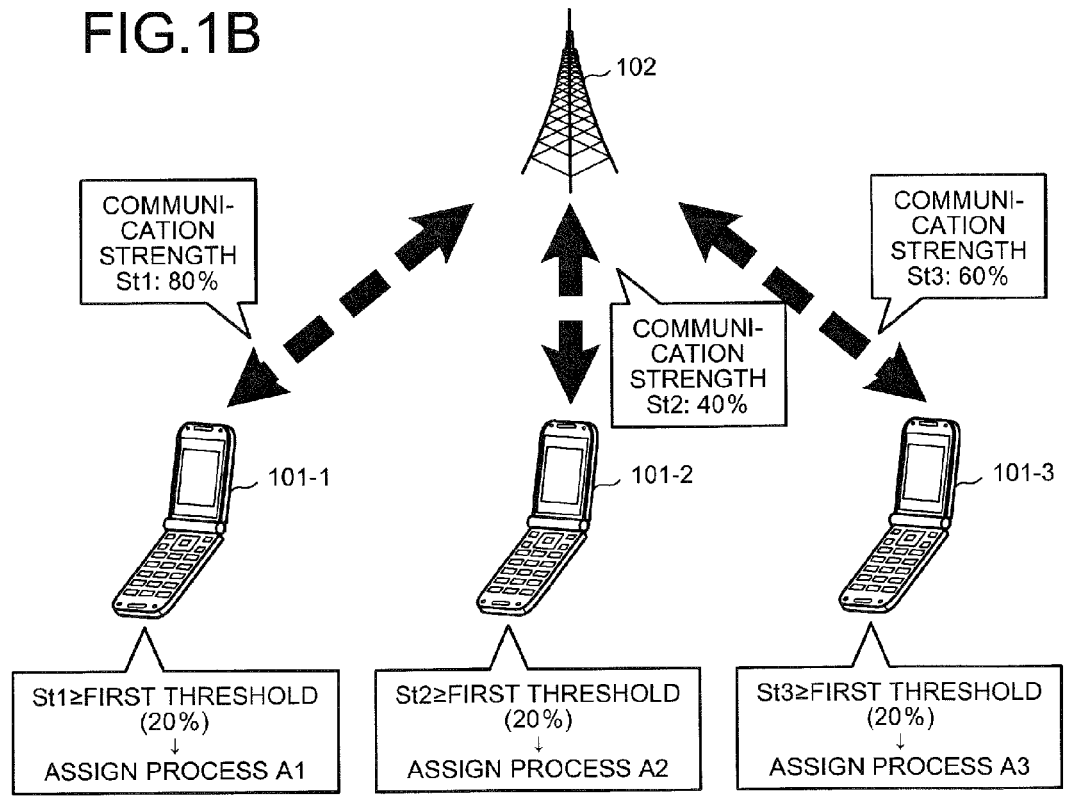

FIGS. 1A and 1B are explanatory views of scheduling examples according to the first embodiment. In description of a scheduling method example of FIGS. 1A and 1B, m="3" is assumed and an execution request for a process using data shared by three terminal apparatuses 101-1 to 101-3 is received by any of the terminal apparatuses. In the following description, an arbitrary terminal apparatus among the terminal apparatuses 101-1 to 101-3 will be referred to as a "terminal apparatus 101-i" (i=1, 2, . . . , m).

The terminal apparatuses 101-1 to 101-3 can communicate with each other via a base station 102. For example, the terminal apparatuses 101-1 to 101-m are mobile telephones, PDAs, and/or notebook PCs. The terminal apparatuses 101-1 to 101-3 can communicate by using radio waves of a communications standard such as a wireless local area network (LAN), Bluetooth (registered trademark), and Long Term Evolution (LTE), 3G, and 4G. The base station 102 is an apparatus that transmits radio waves to the terminal apparatuses 101-1 to 101-3.

Description will be made of a scheduling method example when the terminal apparatus 101-i receives an execution request for a given process A. The process A is a process that includes a process A1, a process A2, and a process A3. The processes A1, A2, and A3 are processes executable in parallel by multiple terminal apparatuses. For example, the process A is an app that generates and displays a map image based on positional information. In this case, the processes A1, A2, and A3 are processes that generate partial images of the map to be generated. The respective partial images generated by the processes A1, A2, and A3 are images that differ from one another.

The terminal apparatus 101-i acquires the communication strength St between the terminal apparatus 101-i and the base station 102. The communication strength St indicates, as a rate, the strength of radio waves received by each of the terminal apparatuses relative to the strength of the radio waves transmitted from the base station 102. The higher the communication strength St is, the more stable the communication connection is. If the communication strength St is low, the communication connection is unstable and is more likely to be interrupted. The communication strength St at the arbitrary terminal apparatus 101-i will hereinafter be referred to as a "communication strength Sti".

In FIG. 1A, the terminal apparatus 101-i acquires 80 [%] as a communication strength St1 at the terminal apparatus 101-1, 15 [%] as a communication strength St2 at the terminal apparatus 101-2, and 60 [%] as a communication strength St3 at the terminal apparatus 101-3. In FIG. 1B, the terminal apparatus 101-i acquires 80 [%] as the communication strength St1, 40 [%] as the communication strength St2, and 60 [%] as the communication strength St3.

The process of the received execution request is assigned to a terminal apparatus 101-i that has a communication strength Sti greater than or equal to a first threshold. The first threshold is a value defined in advance. In the first embodiment, a case of setting the first threshold at 20 [%] will be described. Assigning a process refers to causing execution of the process.

In FIG. 1A, the communication strength St1 and the communication strength St3 are greater than or equal to the first threshold and the communication strength St2 is less than the first threshold. Therefore, the process A1 is assigned to the terminal apparatus 101-1 and the process A2 and the process A3 are assigned to the terminal apparatus 101-3. No process is assigned to the terminal apparatus 101-2. The assignment of the processes is not limited to this example as long as the processes are assigned to the terminal apparatus 101-1 and the terminal apparatus 101-3. For example, the process A1 and the process A3 may be assigned to the terminal apparatus 101-1 and the process A2 may be assigned to the terminal apparatus 101-3.

On the other hand, in FIG. 1B, all the communication strengths St1, St2, and St3 are greater than or equal to the first threshold. Therefore, the process A1, the process A2, and the process A3 are assigned to the terminal apparatus 101-1, the terminal apparatus 101-2, and the terminal apparatus 101-3, respectively. In this case, the assignment of the processes to the terminal apparatuses is not limited to this example as long as the processes A1, A2, and A3 are assigned to the respective terminal apparatuses 101-i. For example, the process A2, the process A3, and the process A1 may be assigned to the terminal apparatus 101-1, the terminal apparatus 101-2, and the terminal apparatus 101-3, respectively.

By assigning the process based on the communication strength Sti in this way, the process can be executed by the terminal apparatus 101-i whose communication state expected not to deteriorate during execution of the process. As a result, the possibility of termination of the process for shared data due to deterioration of the communication state of the terminal apparatus 101-i can be reduced. Therefore, since the communication of the communication terminal 101-i is not interrupted during execution of the process, a lack of a process result due to the deterioration of the communication state can be avoided, enabling completion of the process.

FIG. 2 is an explanatory view of an example of a scheduling system according to the first embodiment. In FIG. 2, m="4" is assumed and a scheduling system 200 includes four terminal apparatuses 101-1 to 101-4 and the base station 102. The terminal apparatuses 101-1 to 101-4 can communicate via the base station 102. The terminal apparatus 101-4 can directly communicate with the terminal apparatus 101-1. The terminal apparatus 101-4 can communicate with the terminal apparatus 101-2 and the terminal apparatus 101-3 via the terminal apparatus 101-1.

The base station 102 is connected via a network 210, such as the Internet, a LAN, and a wide area network (WAN), to another base station (not depicted). The other base station may be connected to terminal apparatuses and the terminal apparatuses 101-1 to 101-4 may be communicable with the terminal apparatuses connected to the other base station.

When receiving from a user, input of an execution request for a process that uses shared data, the terminal apparatus 101-i assigns the shared data and the process based on the communication strengths Sti and the communication speeds of the terminal apparatuses. The user is a person who operates the terminal apparatus 101-i. The communication speed is the amount of data that can be communicated per unit time at each of the terminal apparatuses. For example, a unit of the communication speed is [Mbps] or [kbps]. The communication speed at the terminal apparatus 101-i will hereinafter be referred to as a "communication speed Spi".

Assigning the shared data refers to storing the shared data. In the first embodiment, the shared data is divided and stored in storage areas of multiple terminal apparatuses among the terminal apparatuses 101-1 to 101-4, thereby assigning the shared data. The storage areas storing the divided shared data are storage areas that can be accessed from any of the terminal apparatuses 101-i.

For example, the terminal apparatus 101-i creates a terminal apparatus information table and a data assignment table based on the communication strengths Sti and the communication speeds Spi of the terminal apparatuses; and assigns the shared data and the process based on the terminal apparatus information table and the data assignment table. The terminal apparatus information table is a table for registering a ratio of storage of the shared data and information that indicates whether the process can be assigned. Details of the terminal apparatus information table will be described later with reference to FIG. 4. The data assignment table is a table that includes information that indicates the terminal apparatus 101-i that stores the shared data. Details of the data assignment table will be described later with reference to FIG. 5.

The terminal apparatus 101-i that assigns the shared data and the process will hereinafter be referred to as a "master terminal apparatus". The master terminal apparatus is the terminal apparatus 101-i that has the highest communication strength Sti or the terminal apparatus 101-i that first receives from the user, input of the execution request for the process of the shared data. The terminal apparatus 101-i that executes the process assigned from the master terminal apparatus will hereinafter be referred to as a "slave terminal apparatus". The slave terminal apparatus is a terminal apparatus 101-i other than the master terminal apparatus among the multiple terminal apparatuses 101-1 to 101-m.

If the master terminal apparatus is no longer the terminal apparatus 101-i having the highest communication strength Sti, the master terminal apparatus changes to the slave terminal apparatus. The slave terminal apparatus changes to the master terminal apparatus when receiving from the master terminal apparatus, notification of information indicating that the communication strength Sti has become the highest.

FIG. 3 is a block diagram of a hardware example of the terminal apparatus 101-i according to the first embodiment. In FIG. 3, the terminal apparatus 101-i includes a central processing unit (CPU) 301, read-only memory (ROM) 302, random access memory (RAM) 303, a memory controller 304, flash memory 305, a display 306, a keyboard 307, and a radio frequency (RF) circuit 308. The units are connected to each other through a bus 300.

The CPU 301 is responsible for overall control of the terminal apparatus 101-i . The ROM 302 stores programs such as a boot program. Although the terminal apparatus 101-i is assumed to have the single CPU 301, this is not a limitation and multiple CPUs 301 may be included. The RAM 303 is used as a work area of the CPU 301. The memory controller 304 controls the writing and reading of data of the RAM 303 and, if the RAM 303 is a dynamic random access memory (DRAM), the memory controller 304 controls refresh of the RAM 303. The flash memory 305 is rewritable, non-volatile semiconductor memory.

The display 306 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 306.

The keyboard 307 includes, for example, keys for inputting letters, numerals, and various instructions and performs the input of data. Alternatively, a touch-panel-type input pad or numeric keypad, etc. may be adopted. The RF circuit 308 is connected to an antenna 309 that transmits and receives radio signals. The RF circuit 308 is a high frequency processing unit that via the antenna 309, receives data from a network such as the Internet and transmits data to the network.

The contents of the terminal apparatus information table will be described. The terminal apparatus information table is implemented by a storage device such as the RAM 303 and the flash memory 305 of the terminal apparatus 101-i depicted in FIG. 3, for example. A terminal apparatus information table 400 included in the terminal apparatus 101-i will be described as an example.

Figure 4:
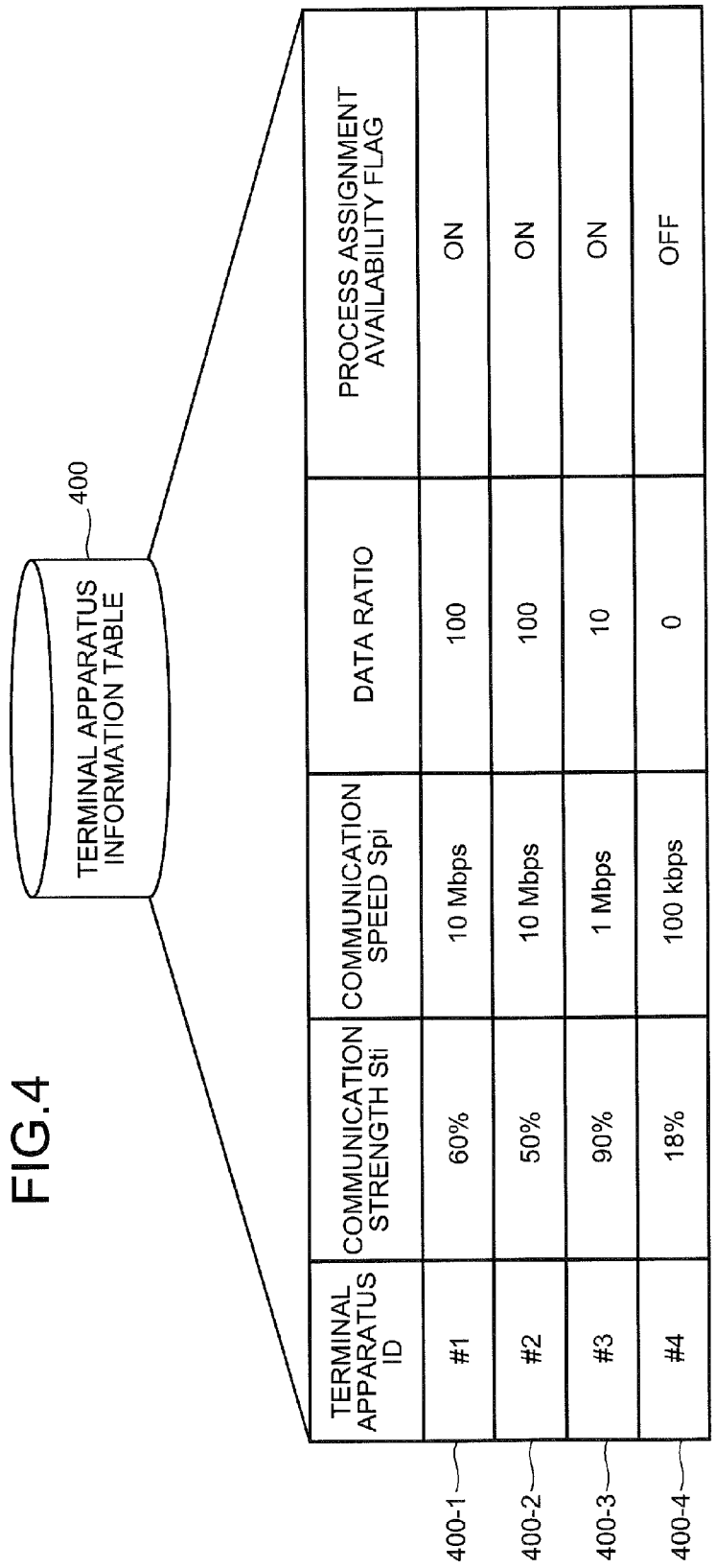
FIG. 4 is an explanatory view of an example of the contents of a terminal apparatus information table of the first embodiment.

FIG. 4 is an explanatory view of an example of the contents of the terminal apparatus information table 400 of the first embodiment. In FIG. 4, the terminal apparatus information table 400 included in the terminal apparatus 101-i has fields of a terminal apparatus ID, the communication strength Sti, the communication speed Spi, a data ratio, and a process assignment availability flag. By setting information in the fields, the terminal apparatus property data 400-1 to 401-4 are stored as records. The terminal apparatus property data for an arbitrary terminal apparatus 101-i will hereinafter be referred to as "terminal apparatus property data 400-i".

The terminal apparatus ID is information for identifying the terminal apparatus 101-i and is "#1" to "#4", for example. The communication strength Sti and the communication speed Spi are as described above. The data ratio is a ratio of the shared data stored in each of the terminal apparatuses. For example, description will be made of a case where one of two terminal apparatuses has a data ratio of "100" while the other terminal apparatus has a data ratio of "10". This means that the ratio between the shared data stored in the one terminal apparatus and the shared data stored in the other terminal apparatus is "100:10". In other words, this means that the one terminal apparatus stores 100/110 of the shared data and the other terminal apparatus stores 10/110 of the shared data. A data ratio of "0" means that no shared data is stored. For example, in the first embodiment, the data ratio is "0" in terminal apparatus property data 400-4 of the terminal apparatus 101-4 having the communication strength Sti less than the first threshold.

The process assignment availability flag is a flag that indicates whether a process can be assigned and the terminal apparatus 101-i having the process assignment availability flag set to ON is a terminal apparatus 101-i to which the master terminal apparatus can assign a process. The terminal apparatus 101-i having the process assignment availability flag set to OFF is a terminal apparatus 101-i to which the master terminal apparatus cannot assign a process. Therefore, the master terminal apparatus assigns a process to the terminal apparatus 101-i having the process assignment availability flag set to ON. For example, in the first embodiment, since the process assignment availability flag is set to OFF in the terminal apparatus property data 400-4 of the terminal apparatus 101-4 having the communication strength Sti less than the first threshold, no process is assigned to the terminal apparatus 101-4.

By way of example, in the case of terminal apparatus property data 400-1, the terminal apparatus ID "#1", the communication strength St1=60%, the communication speed Spi=10 [Mbps], the data ratio "100", and the process assignment availability flag "ON" are stored.

The contents of the data assignment table will be described. For example, the data assignment table is implemented by the storage device such as the RAM 303 and the flash memory 305 of the terminal apparatus 101-i depicted in FIG. 3. A data assignment table 500 included in the terminal apparatus 101-i will be described as an example.

Figure 5:
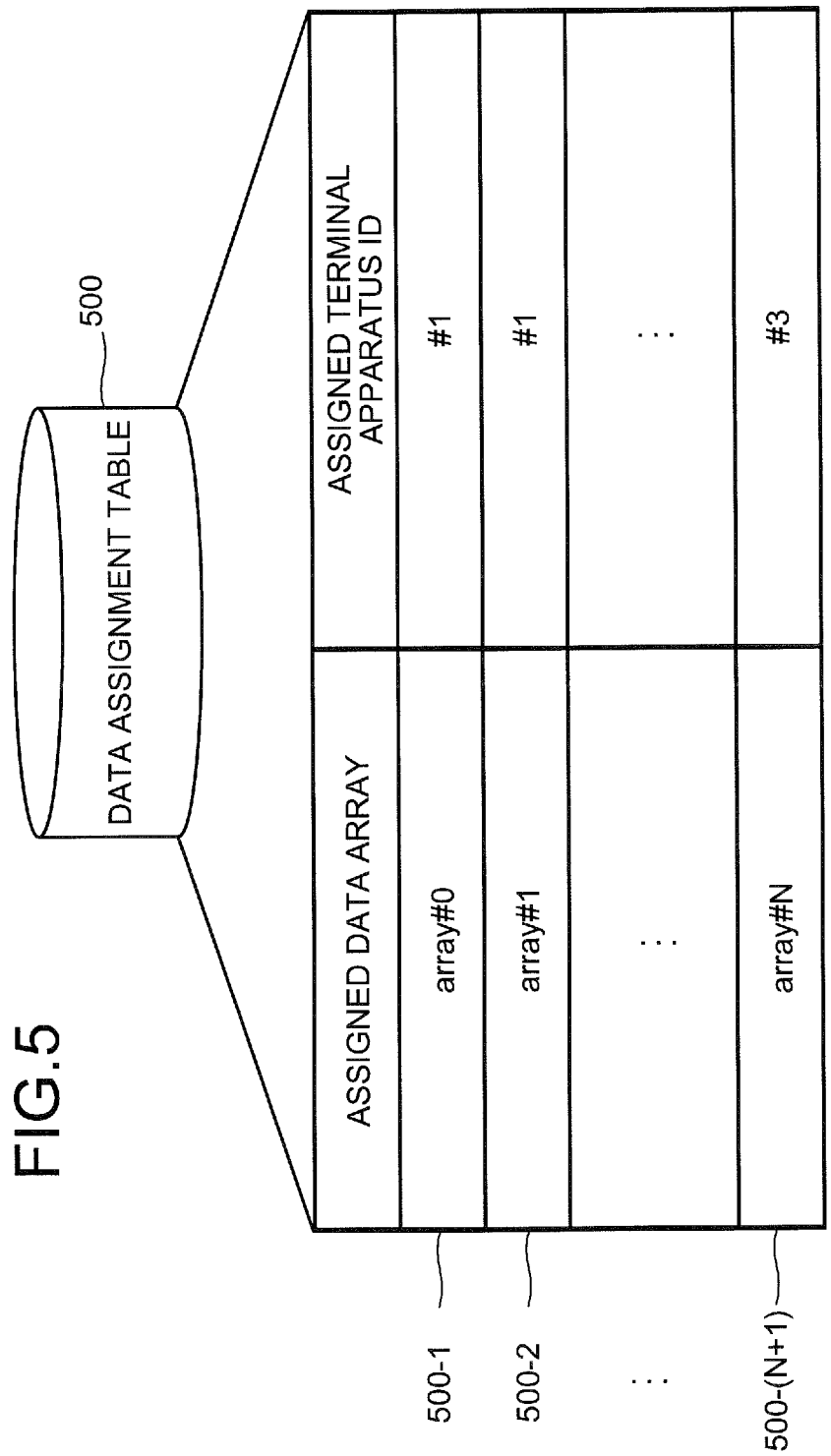
FIG. 5 is an explanatory view of an example of the contents of a data assignment table of the first embodiment.

FIG. 5 is an explanatory view of an example of the contents of the data assignment table 500 of the first embodiment. In FIG. 5, the data assignment table 500 included in the terminal apparatus 101-i has fields of an assigned data array and an assigned terminal apparatus ID. By setting information in the fields, the data assignment property data 500-1 to 500-(N+1) are stored as records.

The assigned data array indicates an array of assignment data assigned after the shared data is divided into N+1 pieces and is "array #0" to "array #N", for example. The assigned terminal apparatus ID indicates the terminal apparatus ID of the terminal apparatus 101-i to which the assignment data is assigned and is "#1" to "#4", for example. In the first embodiment, array #0 to array #N are assigned to #1 to #4 depending on the data ratio included in the terminal apparatus information table 400 in the order from the smallest number.

For example, in the case of data assignment property data 500-1, the assigned data array "array #0" and the assigned terminal apparatus ID "#1" are stored. As described above, since the terminal apparatus 101-4 has a communication strength St4 that is less than the first threshold in the first embodiment, assignment data is not assigned to the terminal apparatus 101-4 and #4 is not included among the assigned terminal apparatus IDs. An example of a method of assigning the shared data to the terminal apparatuses will be described.

Figure 6:
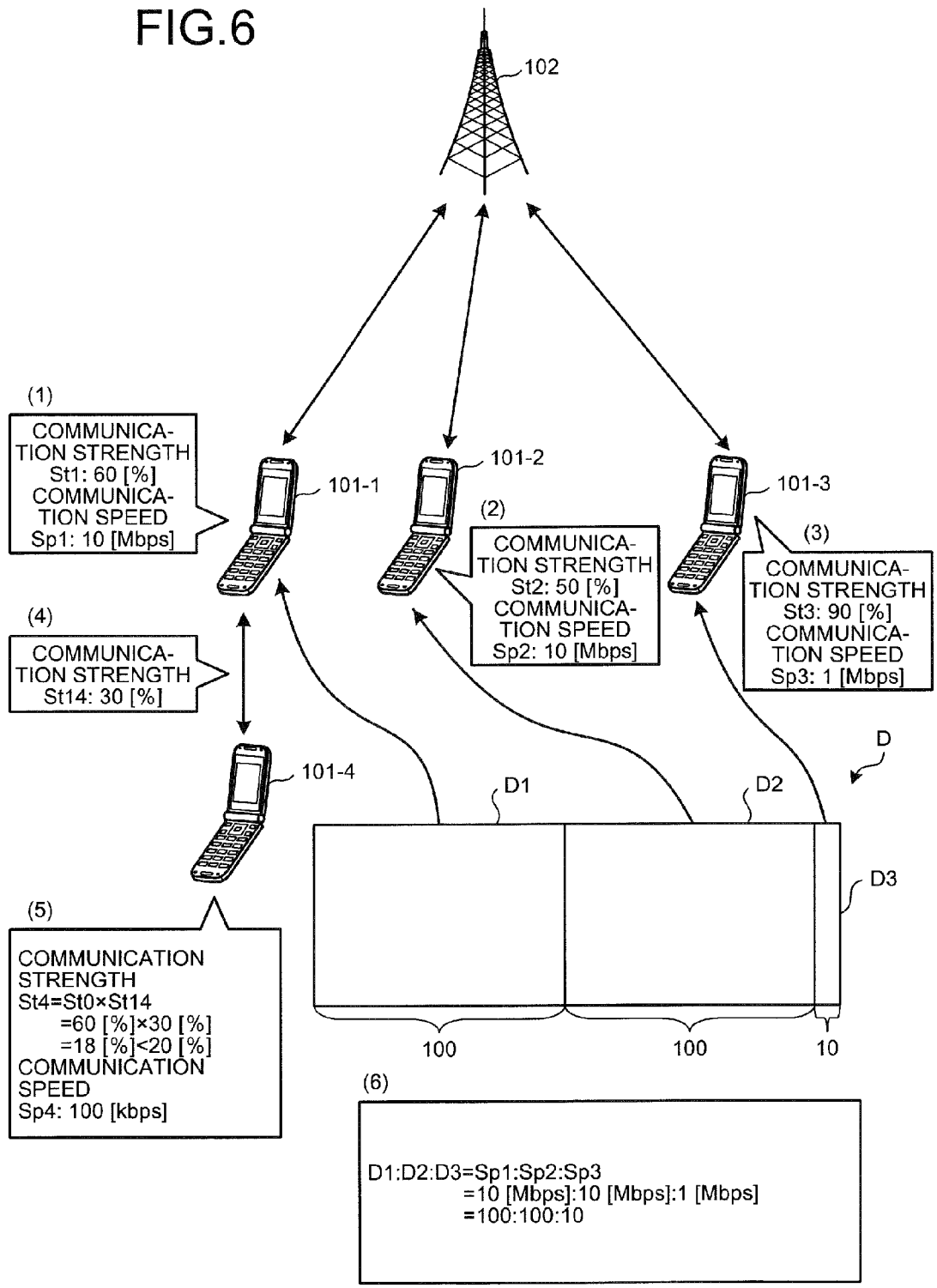
FIG. 6 is an explanatory view of an example of a method of assigning shared data in the first embodiment.

FIG. 6 is an explanatory view of an example of a method of assigning the shared data in the first embodiment. In the method of assigning the shared data depicted in FIG. 6, the master terminal apparatus acquires the communication strength Sti between the terminal apparatus 101-i and the base station 102, and the communication speed Spi of the terminal apparatus 101-i. The shared data shared among the multiple terminal apparatuses 101-1 to 101-m will hereinafter be referred to as "shared data D".

For example, as depicted, (1) the master terminal apparatus acquires 60 [%] as the communication strength St1 between the terminal apparatus 101-1 and the base station 102 and 10 [Mbps] as the communication speed Sp1 of the terminal apparatus 101-1.

As depicted, (2) the master terminal apparatus acquires 50 [%] as the communication strength St2 between the terminal apparatus 101-2 and the base station 102 and 10 [Mbps] as the communication speed Sp2 of the terminal apparatus 101-2. As depicted, (3) the master terminal apparatus acquires 90 [%] as the communication strength St3 between the terminal apparatus 101-3 and the base station 102 and 1 [Mbps] as the communication speed Sp3 of the terminal apparatus 101-3.

The communication strength St4 of the terminal apparatus 101-4 not directly connected to the base station 102 is the product of the communication strengths Sti in via paths from the base station 102 to the terminal apparatus 101-4. Therefore, the communication strength St4 of the terminal apparatus 101-4 is the product of the communication strength St1 between the terminal apparatus 101-1 and the base station 102 and the communication strength St14 between the terminal apparatus 101-4 and the terminal apparatus 101-1.

As depicted, (4) the communication strength St14 between the terminal apparatus 101-4 and the terminal apparatus 101-1 is 30 [%]. Therefore, as depicted, (5) the master terminal apparatus acquires 18 [%], i.e., the product of 60 [%] that is the communication strength St1 and 30 [%] that is the communication strength St14, as the communication strength St4 between the terminal apparatus 101-4 and the base station 102. The master terminal apparatus acquires 100 [kbps] as the communication speed Sp4 in the terminal apparatus 101-4. The master terminal apparatus registers the acquired communication strengths Sti and communication speeds Spi into the terminal apparatus information table 400.

The master terminal apparatus assigns the shared data D to the terminal apparatuses in proportion corresponding to the ratio of the communication speed Spi of the terminal apparatus 101-i. In this case, the master terminal apparatus assigns a process to a terminal apparatus 101-i other than a terminal apparatus 101-i having a communication strength Sti that is greater than or equal to the first threshold of 20 [%]. The shared data D divided and assigned to the terminal apparatus 101-i will hereinafter be referred to as "assigned data Di".

For example, as depicted, (6) the ratio of the assigned data D1, the assigned data D2, and the assigned data D3 is the ratio of the communication speed Sp1, the communication speed Sp2, and the communication speed Sp3. Since Sp1:Sp2:Sp3 is 10 [Mbps]:10 [Mbps]:1 [Mbps], the ratio of the assigned data D1, the assigned data D2, and the assigned data D3 is obtained as 100:100:10. Since the communicate strength St4 is lower than the first threshold of 20 [%], the shared data D is not assigned to the terminal apparatus 101-4.

The master terminal apparatus registers the obtained ratio into the terminal apparatus information table 400. The master terminal apparatus creates the data assignment table 500 according to the terminal apparatus information table 400 and assigns the shared data D to the terminal apparatuses according to the created data assignment table 500.

Figure 7:
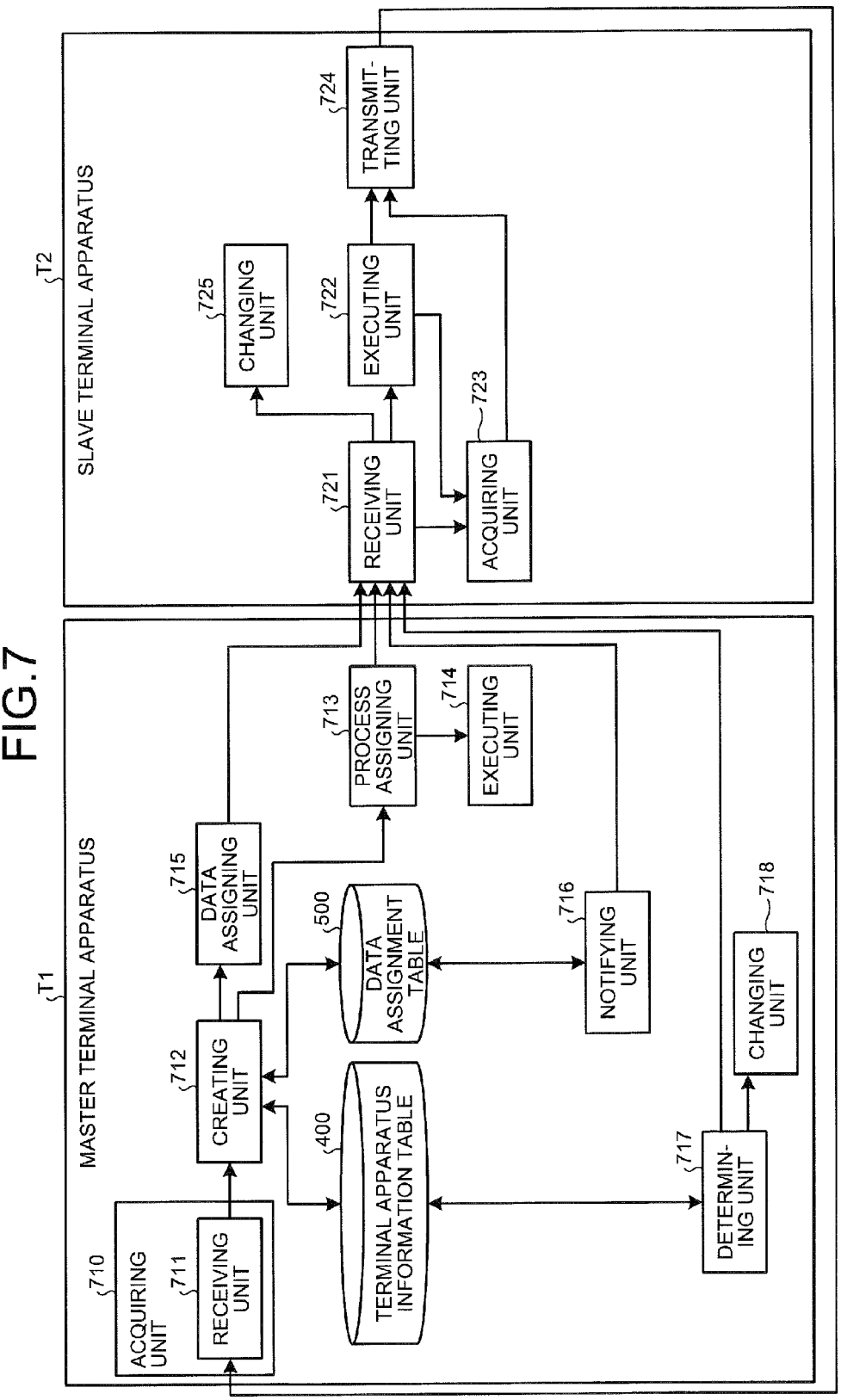
FIG. 7 is a block diagram depicting an example of functions of a master terminal apparatus and a slave terminal apparatus in the first embodiment.

An example of functions of the master terminal apparatus and the slave terminal apparatus will be described. FIG. 7 is a block diagram depicting an example of the functions of the master terminal apparatus and the slave terminal apparatus in the first embodiment. The master terminal apparatus and the slave terminal apparatus will hereinafter be referred to as a "master terminal apparatus T1" and a "slave terminal apparatus T2".

The master terminal apparatus T1 has, as functional units, an acquiring unit 710, a receiving unit 711, a creating unit 712, a process assigning unit 713, an executing unit 714, a data assigning unit 715, a notifying unit 716, a determining unit 717, and a changing unit 718. The master terminal apparatus T1 also has the terminal apparatus information table 400 and the data assignment table 500 used for processes at the functional units. For example, the functions acting as a control unit (the acquiring unit 710 to the changing unit 718) are implemented by causing the CPU 301 to execute programs stored in a storage device such as the ROM 302, the RAM 303, and the flash memory 305 depicted in FIG. 3.

In the description of the master terminal apparatus T1, a first apparatus is the master terminal apparatus T1; a second apparatus is a terminal apparatus 101-i acting as the master terminal apparatus T1 in the next process; and a third apparatus is the slave terminal apparatus T2.

The acquiring unit 710 acquires the communication strength Sti of the multiple terminal apparatuses 101-1 to 101-m. For example, the acquiring unit 710 acquires the communication strength Sti between the master terminal apparatus T1 and the base station 102, and the communication strength Sti between the slave terminal apparatus T2 and the base station 102. For example, the acquiring unit 710 acquires the communication strength Sti as a result of measurement of the communication strength Sti by a received signal strength indication (RSSI) included in the antenna 309 of the master terminal apparatus T1. The acquiring unit 710 uses the receiving unit 711 described later to acquire the communication strength Sti between the slave terminal apparatus T2 and the base station 102.

The acquiring unit 710 may acquire the communication speed Spi of the multiple terminal apparatuses 101-1 to 101-m. For example, the acquiring unit 710 acquires the communication speed Spi of the master terminal apparatus T1 and the communication speed Spi of the slave terminal apparatus T2. For example, the acquiring unit 710 sends a ping to another terminal apparatus 101-i and measures a time until a response to the ping has been received to calculate the communication speed Spi of the master terminal apparatus T1 based on the measured time. The acquiring unit 710 uses the receiving unit 711 described later to acquire the communication speed Spi of the slave terminal apparatus T2.

The receiving unit 711 receives a process execution result and the communication strength Sti from at least one terminal apparatus 101-i other than the first apparatus. The at least one terminal apparatus 101-i other than the master terminal apparatus T1 is specifically the slave terminal apparatus T2. Therefore, the communication strength Sti received in this case is the communication strength Sti of the slave terminal apparatus T2. The process execution result is a process result of the process assigned to the slave terminal apparatus T2 by the master terminal apparatus T1. For example, if the process is the app that generates a map image described with reference with FIG. 1, the process result is a partial image of a map image to be generated. For example, the receiving unit 711 receives a signal that includes information concerning the communication strength Sti of the slave terminal apparatus T2 and the process execution result transmitted from the slave terminal apparatus T2.

The receiving unit 711 may receive the process execution result and the communication strength Sti for the identification information of each slave terminal apparatus T2. The identification information of the terminal apparatus 101-i is information for identifying the terminal apparatus 101-i, and is the terminal apparatus ID described above, for example. The receiving unit 711 receives the communication speed Spi of the slave terminal apparatus T2. For example, the receiving unit 711 receives a signal that includes the identification information and the communication speed Spi of the slave terminal apparatus T2 from the slave terminal apparatus T2.

The receiving unit 711 receives the communication strength Sti of the third apparatus in a predetermined cycle. For example, when no task is in an executable state, the receiving unit 711 receives the communication strength Sti from the slave terminal apparatus T2 at each predetermined cycle.

The creating unit 712 creates the terminal apparatus information table 400 based on the communication strength Sti acquired by the acquiring unit 710. For example, the creating unit 712 registers the communication strength Sti received by the receiving unit 711 into the terminal apparatus information table 400 for the identification information of each terminal apparatus 101-i . The creating unit 712 registers the process assignment availability flag according to the communication strength Sti. In this case, the creating unit 712 may determine for each communication strength acquired by the acquiring unit 710, whether the communication strength is greater than or equal to the first threshold, and may register ON as the process assignment availability flag for a terminal apparatus 101-i having a communication strength Sti determined to be greater than or equal to the first threshold. For example, as described with reference to FIG. 4, the creating unit 712 registers ON as the process assignment availability flag for the terminal apparatus property data 400-1 to 401-3 corresponding to the terminal apparatuses 101-1 to 101-3. Although the first threshold is set to 20 [%] as described above, this is not a limitation.

The creating unit 712 may create the data assignment table 500 based on the communication speed Spi acquired by the acquiring unit 710. For example, the creating unit 712 creates the terminal apparatus information table 400 based on the communication speed Spi and creates the data assignment table 500 based on the created terminal apparatus information table 400. For example, the creating unit 712 registers the communication speed Spi acquired by the acquiring unit 710 into the terminal apparatus information table 400 for the identification information of each terminal apparatus 101-i and registers a ratio of the registered communication speed Spi as the data ratio. The creating unit 712 specifies to which terminal apparatus 101-i, the shared data D is to be assigned based on the registered data ratio. The creating unit 712 registers the identification information of the specified terminal apparatus 101-i as the assigned terminal apparatus ID of the data assignment table 500 according to a corresponding assigned data array.

Based on the communication strength Sti acquired by the acquiring unit 710, the process assigning unit 713 assigns to a terminal apparatus 101-i among the multiple terminal apparatuses 101-1 to 101-m, a process that uses the shared data D. For example, the process assigning unit 713 assigns the process to at least one terminal apparatus among the multiple terminal apparatuses 101-1 to 101-m, based on the terminal apparatus information table 400. For example, the process assigning unit 713 transmits an execution request for a task to the slave terminal apparatus T2 to assign to the slave terminal apparatus T2, a process that uses the shared data D. For example, the process assigning unit 713 transmits an execution request for the process to the executing unit 714 to assign the process to the master terminal apparatus T1. For example, the process assigning unit 713 assigns the process that uses the shared data D to the terminal apparatus 101-i of the terminal apparatus property data 400-i having ON registered as the process assignment availability flag in the terminal apparatus information table 400.

If multiple terminal apparatuses are defined as assignment destinations, the process assigning unit 713 divides the process to be executed into multiple processes and assigns the resulting processes to the terminal apparatuses. For example, the process assigning unit 713 divides a program to be executed and transmits execution codes of the divided program to the slave terminal apparatuses T2 to assign the divided processes to the terminal apparatuses 101-i . If the slave terminal apparatuses T2 have the execution code of the program before the division, the process assigning unit 713 may transmit offset values of the execution code.

The process assigning unit 713 assigns the process that uses the shared data D to the terminal apparatus 101-i having a communication strength Sti that is acquired by the acquiring unit 710 and greater than or equal to the first threshold. For example, if the communication strength Sti of the third apparatus included among the multiple terminal apparatuses is greater than or equal to the first threshold, the process assigning unit 713 assigns the process to the third apparatus, and if the communication strength Sti is less than the first threshold, the process assigning unit 713 does not assign the process to the third apparatus. Whether the communication strength Sti is greater than or equal to the first threshold can be determined by the process assignment availability flag of the terminal apparatus information table 400.

For example, the process assigning unit 713 identifies the terminal apparatuses 101-i having "ON" as the process assignment availability flag of the respective terminal apparatus property data 400-i registered in the terminal apparatus information table 400 and assigns the process to the identified terminal apparatuses 101-i . For example, the process assigning unit 713 assigns the process to the terminal apparatuses 101-1 to 101-3 of the terminal apparatus property data 400-1 to 400-3 having ON registered as the process assignment availability flag. As a result, the master terminal apparatus T1 can assign the process to a terminal apparatuses 101-i having a lower possibility of suffering deterioration of the communication state as compared to the terminal apparatuses 101-i having a communication strength Sti that is less than the first threshold. Therefore, this enables the possibility of termination of the process due to deterioration of the communication state during execution of the process to be reduced.

If the process that uses the shared data is assigned based on the communication strength Sti acquired by the acquiring unit 710, the process assigning unit 713 may assign the process to a predetermined number of the terminal apparatuses 101-i in descending order of the acquired communication strength Sti, for example.

If a process execution request from the process assigning unit 713 is received, the executing unit 714 executes the process. For example, the executing unit 714 identifies a program corresponding to the process of the received execution request from among the programs stored in a storage device such as the ROM 302, the RAM 303, and the flash memory 305, and executes the identified program. The executing unit 714 refers to the data assignment table 500 to identify the terminal apparatus 101-i that has been assigned the shared data D used in the process of the received execution request and refers to the shared data D from the identified terminal apparatuses 101-i to execute the process.

Based on the communication strength Sti acquired by the acquiring unit 710, the data assigning unit 715 assigns the shared data D to a terminal apparatus 101-i among the multiple terminal apparatuses 101-1 to 101-m . For example, the data assigning unit 715 transmits assignment data to assign the shared data D to the slave terminal apparatus T2. For example, the data assigning unit 715 writes assignment data into a storage device such as the RAM 303 and the flash memory 305 of the master terminal apparatus T1 to assign the shared data D to the master terminal apparatus T1. As a result, the master terminal apparatus T1 can assign the shared data D to the terminal apparatus 101-i with consideration of the communication strength Sti.

When the data assignment table 500 has changed, the data assigning unit 715 assigns the shared data D to at least one terminal apparatus among the multiple terminal apparatuses, based on the changed data assignment table 500. The data assignment table 500 has changed when the creating unit 712 updates the data assignment table 500. Therefore, if the communication strength Sti or the communication speed Spi of the terminal apparatus 101-i registered in the data assignment table 500 changes, the data assigning unit 715 assigns the shared data D based on the data assignment table 500. When a process execution request is received from a user and the creating unit 712 creates the data assignment table 500, the data assigning unit 715 assigns the shared data D. The data assigning unit 715 may assign the shared data D by transmitting to another terminal apparatus, information indicating that the assignment data based on the data assignment table 500 is transmitted and received between the terminal apparatuses.

If the shared data D is assigned to multiple terminal apparatuses, the data assigning unit 715 divides the shared data D to be assigned into multiple assignment data and then assigns the resulting assignment data to the multiple terminal apparatuses. In this case, the size of the assignment data may be determined based on the communication speed Spi of the terminal apparatuses. For example, when the value of the communication speed Spi of the terminal apparatuses is larger, the data assigning unit 715 may assign assignment data of a larger size. As a result, the time required for transmitting/receiving the assignment data can be reduced and the efficiency of the process for the shared data D can be increased. For example, the data assigning unit 715 may assign the assignment data at the same ratio as the ratio of the communication speed Spi of the terminal apparatuses.

The data assigning unit 715 may assign the shared data D to the acquired terminal apparatuses 101-i that have a communication strength Sti greater than or equal to the first threshold. For example, the data assigning unit 715 identifies from the respective terminal apparatus property data 400-i registered in the terminal apparatus information table 400, the terminal apparatuses 101-i that have a communication strength Sti greater than or equal to the first threshold and assigns the shared data D to the identified terminal apparatuses 101-i . For example, the data assigning unit 715 assigns the shared data D to the terminal apparatuses 101-1 to 101-3 that have a communication strength Sti that is greater than or equal to the first threshold. As a result, the master terminal apparatus T1 assigns the shared data D to the terminal apparatuses 101-i that have a lower possibility of suffering deterioration of the communication state as compared to terminal apparatuses 101-i that have a communication strength Sti that is less than the first threshold, thereby enabling the possibility of an inability to access the shared data D consequent to deterioration of the communication state of the terminal apparatuses 101-i to be reduced.

If the shared data D is assigned based on the communication strength Sti acquired by the acquiring unit 710, the data assigning unit 715 may assign the shared data D to a predetermined number of the terminal apparatuses in descending order of the acquired communication strength Sti, for example.

The notifying unit 716 notifies the multiple terminal apparatuses 101-1 to 101-m of the data assignment table 500. For example, the notifying unit 716 transmits the data assignment table 500 created by the creating unit 712 to the slave terminal apparatus T2 to give notification of the data assignment table 500. The notifying unit 716 may transmit a portion of the data assignment table 500 updated by the creating unit 712 to the slave terminal apparatus T2 to give notification of the data assignment table 500.

The determining unit 717 determines from among the multiple terminal apparatuses and based on the terminal apparatus information table 400, the second apparatus that is to assign the next process. For example, the determining unit 717 determines the terminal apparatus 101-i having the highest communication strength Sti as the second apparatus from among the multiple terminal apparatuses 101-1 to 101-m . For example, the determining unit 717 determines the terminal apparatus 101-3, which has the highest communication strength Sti, to be the second apparatus. As a result, the terminal apparatus 101-i with the lowest possibility of interruption of communication can be caused to perform the assignment of the process or the assignment of the shared data D. Therefore, the possibility of termination of the process because of the absence of assignment of the process or of the shared data D due to deterioration of the communication state can be reduced as far as possible.

The determining unit 717 transmits information that includes an assignment request for the next process to the terminal apparatus 101-i determined as the second apparatus. The information that includes the assignment request for the next process is information that indicates a change from the slave terminal apparatus T2 to the master terminal apparatus T1.

If the second apparatus determined by the determining unit 717 is not the master terminal apparatus T1, the changing unit 718 changes the master terminal apparatus T1 to the slave terminal apparatus T2. Changing the master terminal apparatus T1 to the slave terminal apparatus T2 means that, for example, a master flag that indicates the master terminal apparatus T1 is turned OFF to achieve a state in which the function of the slave terminal apparatus T2 is executable.

As described above, the master terminal apparatus T1 according to the first embodiment acquires the communication strengths of the multiple terminal apparatuses 101-1 to 101-m that share the shared data D. The master terminal apparatus T1 selects any terminal apparatus 101-i from among the multiple terminal apparatuses based on the acquired communication strengths. For example, the master terminal apparatus T1 determines if the acquired communication strengths are greater than or equal to the first threshold and selects the terminal apparatuses 101-i that have a communication strength Sti determined to be greater than or equal to the first threshold.

The master terminal apparatus T1 assigns the process using the shared data D to any of the selected terminal apparatuses 101-i . As a result, the process can be assigned to the terminal apparatus 101-i with the lowest possibility of suffering deterioration of the communication state and the process can be continued without deterioration of the communication strength Sti of the terminal apparatus 101-i during execution of the process. Therefore, a lack of a process result due to an inability to synchronize the process results is avoided, enabling completion of the process that uses the shared data D.

The master terminal apparatus T1 assigns the shared data D to any of the selected terminal apparatuses 101-i . As a result, the shared data D is be assigned to the terminal apparatus 101-i with the lowest possibility of deterioration of the communication state, enabling the process to be continued without deterioration of the communication strength Sti of the terminal apparatus 101-i that stores the shared data D. Therefore, a lack of a process result due to an inability to access the shared data D is avoided, enabling completion of the process that uses the shared data D.

The master terminal apparatus T1 acquires the communication speed Spi of the multiple terminal apparatuses 101-1 to 101-m that share the shared data D and assigns the assignment data of a larger size to a terminal apparatus 101-i having a higher communication speed Spi. For example, the master terminal apparatus T1 assigns the assignment data of a size having the same ratio as the ratio of the communication speed Spi of the terminal apparatuses. As a result, the time required for transmitting/receiving the shared data D can be reduced.

The master terminal apparatus T1 is the terminal apparatus 101-i having the highest communication strength Sti among the multiple terminal apparatuses 101-1 to 101-m . This enables a reduction in the possibility of deterioration of the communication state of the terminal apparatus 101-i that performs the assignment of the process and the assignment of the shared data D, and enables the process to be continued.

The slave terminal apparatus T2 includes a receiving unit 721, an executing unit 722, an acquiring unit 723, a transmitting unit 724, and a changing unit 725. For example, the functions acting as a control unit (the receiving unit 721 to the changing unit 725) are implemented by causing the CPU 301 to execute programs stored in a storage device such as the ROM 302, the RAM 303, and the flash memory 305 depicted in FIG. 3.

In the description of the slave terminal apparatus T2, the first apparatus is the master terminal apparatus T1 and the second apparatus is the slave terminal apparatus T2.

The receiving unit 721 receives an execution request for a task from the first apparatus to the second apparatus. For example, the receiving unit 721 receives from the data assigning unit 715 of the master terminal apparatus T1, an execution request for a task. In this case, the receiving unit 721 may receive the execution code of a program. The receiving unit 721 may receive an offset value of the execution code of the program.

The receiving unit 721 receives assignment data. For example, the receiving unit 721 receives assignment data transmitted from the data assigning unit 715 of the master terminal apparatus T1 and assignment data transmitted from another slave terminal apparatus T2. The assignment data received by the receiving unit 721 is written into a storage device such as the RAM 303 and the flash memory 305. The receiving unit 721 may receive from the master terminal apparatus T1 the information indicating that the assignment data is transmitted and received between the terminal apparatuses.

The receiving unit 721 may receive from the master terminal apparatus T1, notification of the data assignment table 500 from the notifying unit 716. For example, the receiving unit 721 may receive the notification from the notifying unit 716 by receiving a signal that includes the information of the data assignment table 500 and is transmitted by the notifying unit 716. For example, the receiving unit 721 may receive notification from the notifying unit 716 by receiving a signal transmitted from the notifying unit 716 and indicating that the data assignment table 500 is updated.

The receiving unit 721 may receive information including an assignment request for the next process. For example, the receiving unit 721 acquires information that is transmitted from the determining unit 717 of the master terminal apparatus T1 and requests a change to the master terminal apparatus T1.

The executing unit 722 executes a process based on the execution request for a task received by the receiving unit 721. If the execution code of the program has been received by the receiving unit 721, the executing unit 722 reads the execution code and executes the task. If the offset value of the execution code has been received by the receiving unit 711, the executing unit 722 reads the execution code from the offset value in the execution code to execute the task. The executing unit 722 refers to the data assignment table 500 and identifies the terminal apparatus 101-i that has been assigned the shared data D used in execution of the process. The executing unit 722 accesses the shared data D from the identified terminal apparatus 101-i and executes the process.

The acquiring unit 723 acquires the communication strength Sti of the slave terminal apparatus T2. For example, the communication strength Sti is measured by RSSI from the radio waves received by the antenna 309 and the acquiring unit 723 acquires the communication strength Sti measured by RSSI.

The acquiring unit 723 acquires the communication strength Sti when no execution request for a task has been received from the master terminal apparatus T1 for a predetermined period. When no execution request has been received for a predetermined period, the communication strength Sti of the slave terminal apparatus T2 is less than the first threshold and therefore, no process is assigned. For example, the acquiring unit 723 acquires the communication strength Sti while no execution request has been received. The acquiring unit 723 may measure an elapsed time from the time point of reception of an execution request and may acquire the communication strength Sti if the elapsed time reaches a predetermined time.

The acquiring unit 723 may acquire the communication speed Spi of the slave terminal apparatus T2. For example, the acquiring unit 723 sends a ping to another terminal apparatus and measures the time until a response to the ping has been received to calculate the communication speed Spi of the slave terminal apparatus T2 based on the measured time.

The transmitting unit 724 transmits a task execution result and the communication strength Sti to the master terminal apparatus T1. For example, the transmitting unit 724 transmits to the master terminal apparatus T1, a signal that includes information of a process result of the process executed by the executing unit 722 and the communication strength Sti acquired by the acquiring unit 723. The task execution result and the communication strength Sti transmitted from the transmitting unit 724 are received by the receiving unit 711 of the master terminal apparatus T1.

The transmitting unit 724 transmits the communication strength Sti to the first apparatus if the communication strength Sti is greater than the first threshold. For example, the transmitting unit 724 determines whether the communication strength Sti acquired by the acquiring unit 723 is greater than or equal to the first threshold and transmits to the master terminal apparatus T1, a signal that includes the information of the process result and the communication strength Sti if the acquired communication strength Sti is greater than or equal to the first threshold.

Therefore, if the communication strength Sti of the slave terminal apparatus T2 changes from a level less than the first threshold to a level greater than or equal to the first threshold, the master terminal apparatus T1 is notified of the communication strength Sti of the slave terminal apparatus T2. Even if the master terminal apparatus T1 is notified of the communication strength Sti while the communication strength Sti of the slave terminal apparatus T2 continues to be less than the first threshold, the assignment of the process is not changed, resulting in meaningless communication. Therefore, by notifying the master terminal apparatus T1 of the communication strength Sti if the communication strength Sti of the slave terminal apparatus T2 changes from a level less than the first threshold to a level greater than or equal to the first threshold, meaningless communication can be reduced.

The transmitting unit 724 transmits the communication speed Spi to the master terminal apparatus T1 along with the communication strength Sti. For example, the transmitting unit 724 transmits to the master terminal apparatus T1, a signal that includes the information of the communication strength Sti and the communication speed Spi of the terminal apparatus thereof acquired by the acquiring unit 723.

The transmitting unit 724 may transmit the assignment data to another terminal if the receiving unit 721 receives information indicating that the assignment data is transmitted and received between the terminal apparatuses. For example, the transmitting unit 724 transmits the assignment data to another terminal based on the data assignment table 500 received by the receiving unit 721.

If the receiving unit 721 receives information that indicates a transition from the slave terminal apparatus T2 to the master terminal apparatus T1, the changing unit 725 changes the slave terminal apparatus T2 to the master terminal apparatus T1. Changing the slave terminal apparatus T2 to the master terminal apparatus T1 means that, for example, the master flag that indicates the master terminal apparatus T1 is turned ON to achieve a state in which the function of the master terminal apparatus T1 is executable.

As described above, the slave terminal apparatus T2 executes the process assigned from the master terminal apparatus T1. The slave terminal apparatus T2 stores the assignment data assigned from the master terminal apparatus T1.

Figure 8:
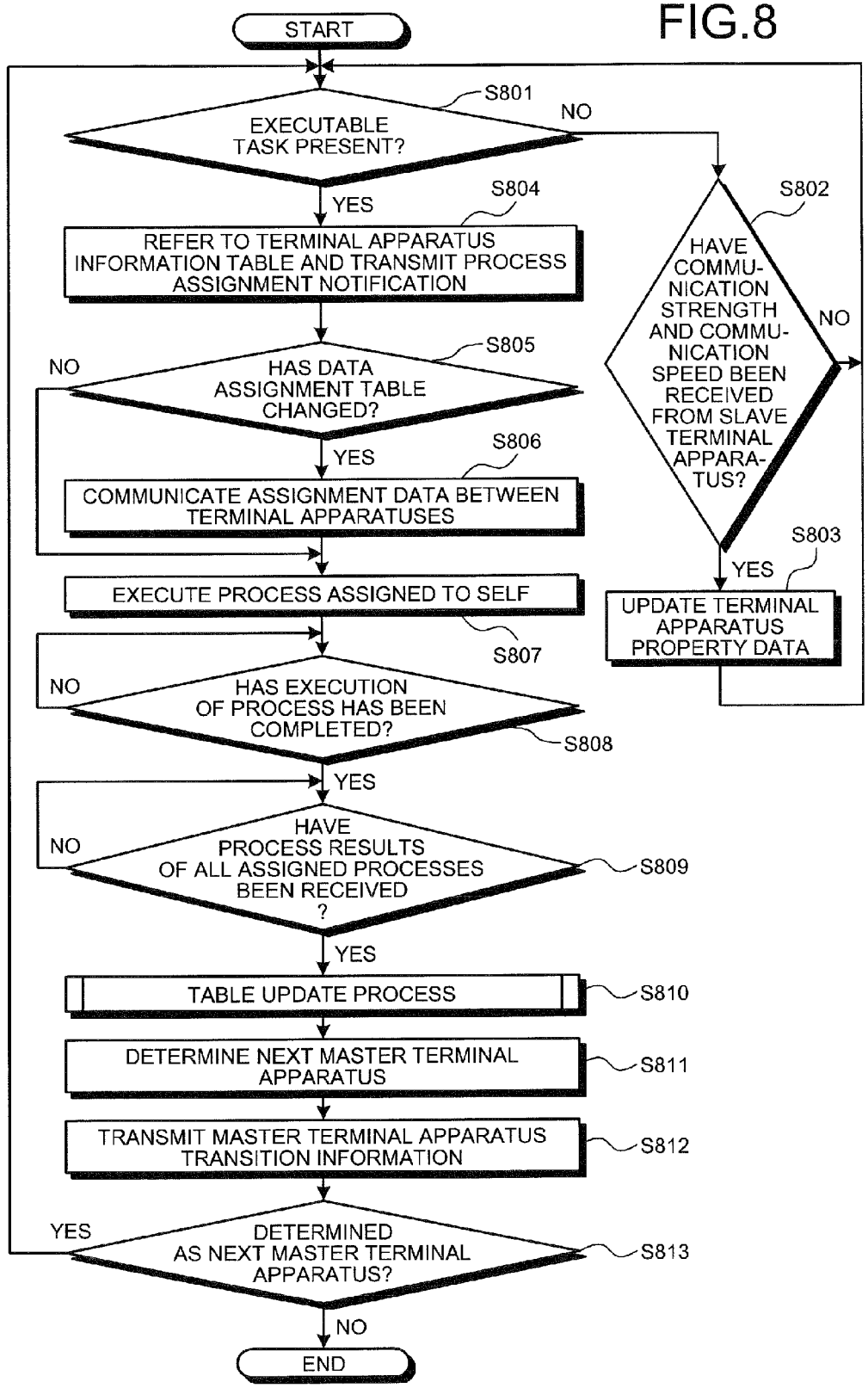
FIG. 8 is a flowchart of an example of a master terminal process procedure of the master terminal apparatus according to the first embodiment.

FIG. 8 is a flowchart of an example of a master terminal process procedure of the master terminal apparatus T1 according to the first embodiment. The master terminal process is a process executed by the CPU 301 of the master terminal apparatus T1.

In the master terminal process, the master terminal apparatus T1 determines whether a task in an executable state is present (step S801). If no task in an executable state is present (step S801: NO), the master terminal apparatus T1 determines whether the communication strength Sti and the communication speed Spi have been received from the slave terminal apparatus T2 (step S802).

If the communication strength Sti and the communication speed Spi have been received from the slave terminal apparatus T2 (step S802: YES), the master terminal apparatus T1 updates in the terminal apparatus information table 400, the terminal apparatus property data 400-i (step S803) and proceeds to step S801. If the communication strength Sti and the communication speed Spi have not been received from the slave terminal apparatus T2 at step S802 (step S802: NO), the master terminal apparatus T1 proceeds to step S801.

If a task in an executable state is present at step S801 (step S801: YES), the master terminal apparatus T1 refers to the terminal apparatus information table 400 and transmits process assignment notification to the slave terminal apparatus T2 (step S804). For example, the master terminal apparatus T1 transmits the process assignment notification to the terminal apparatuses 101-i having ON as the process assignment availability flag of the terminal apparatus information table 400. The process assignment notification includes information of the contents of the process to be assigned. The contents of the process to be assigned are determined at this point. In this case, the master terminal apparatus T1 registers the process to be assigned to the master terminal apparatus T1 into an execution queue.

The master terminal apparatus T1 then determines whether the data assignment table 500 has changed (step S805). For example, the master terminal apparatus T1 determines whether a change flag that indicates a change in the data assignment table 500 is set to ON and thereby, determines whether the data assignment table 500 has changed. In this case, for example, the master terminal apparatus T1 sets the change flag to ON when the data assignment table 500 is updated, and sets the change flag to OFF when it is determined that the data assignment table 500 has changed.

If it is determined that the data assignment table 500 has changed at step S805 (step S805: YES), the master terminal apparatus T1 refers to the data assignment table 500 to perform the transmission/reception of the assignment data between the terminal apparatuses (step S806). In this case, the master terminal apparatus T1 outputs a request for transmission/reception of the assignment data to another terminal apparatus and if the assignment data of the master terminal apparatus T1 has changed, the master terminal apparatus T1 outputs the assignment data to another terminal apparatus depending on details of the change. The master terminal apparatus T1 stores update details when the data assignment table 500 is updated. As a result, the master terminal apparatus T1 assigns the shared data D.

After step S806, or if it is determined at step S805 that the data assignment table 500 is not changed (step S805: NO), the master terminal apparatus T1 executes the process assigned thereto (step S807). The master terminal apparatus T1 determines whether the execution of the process has been completed (step S808) and if not completed (step S808: NO), the master terminal apparatus T1 outputs waits until the process has been completed.

If the execution of the process has been completed at step S808 (step S808: YES), the master terminal apparatus T1 determines whether the process results of all the processes assigned to the slave terminal apparatuses T2 have been received (step S809). If the process results of all the processes assigned to the other terminal apparatuses have not been received (step S809: NO), the master terminal apparatus T1 waits until the process results have been received.

If the process results of all the processes assigned to the other terminal apparatuses have been received at step S809 (step S809: YES), the master terminal apparatus T1 executes a table update process for updating the terminal apparatus information table 400 and the data assignment table 500 (step S810). Details of the table update process will be described later with reference to FIG. 9.

The master terminal apparatus T1 then refers to the terminal apparatus information table 400 to determine the terminal apparatus 101-i having the largest value of the communication strength Sti as the next master terminal apparatus T1 (step S811). The master terminal apparatus T1 transmits master terminal apparatus transition information to the terminal apparatus 101-i determined as the next master terminal apparatus T1 (step S812). The master terminal apparatus transition information is information including an execution request for assignment of the next process, i.e., information that indicates a change to the master terminal apparatus T1.

After step S812, the master terminal apparatus T1 determines whether the terminal apparatus 101-i determined as the next master terminal apparatus T1 is the master terminal apparatus T1 (step S813). If the master terminal apparatus T1 is the master terminal apparatus T1 in the next process (step S813: YES), the master terminal apparatus T1 proceeds to step S801. If the master terminal apparatus T1 is not the master terminal apparatus T1 in the next process (step S813: NO), the master terminal apparatus T1 terminates the series of operations of this flowchart. If the series of operations of this flowchart is terminated, the master terminal apparatus T1 changes to the slave terminal apparatus T2 to execute a slave terminal process described later with reference to FIG. 10.

By executing the master terminal process, the master terminal apparatus T1 can assign based on the terminal apparatus information table 400, the process that uses the shared data D. In other words, the terminal apparatus 101-i can assign based on the communication strength Sti, the process that uses the shared data D. As a result, the process can be assigned to the terminal apparatus 101-i with the lowest possibility of interruption of communication. Therefore, the possibility of process termination because of an inability to synchronize process results can be reduced.

By executing the master terminal process, the terminal apparatus 101-i can assign the shared data D based on the terminal apparatus information table 400. In other words, the terminal apparatus 101-i can assign the shared data D based on the communication strength Sti between the terminal apparatus 101-i and the base station 102. As a result, the shared data D can be assigned to a terminal apparatus 101-i with a lower possibility of interruption of communication. Therefore, the possibility of process termination due to an inability to access the shared data D can be reduced.

Figure 9:
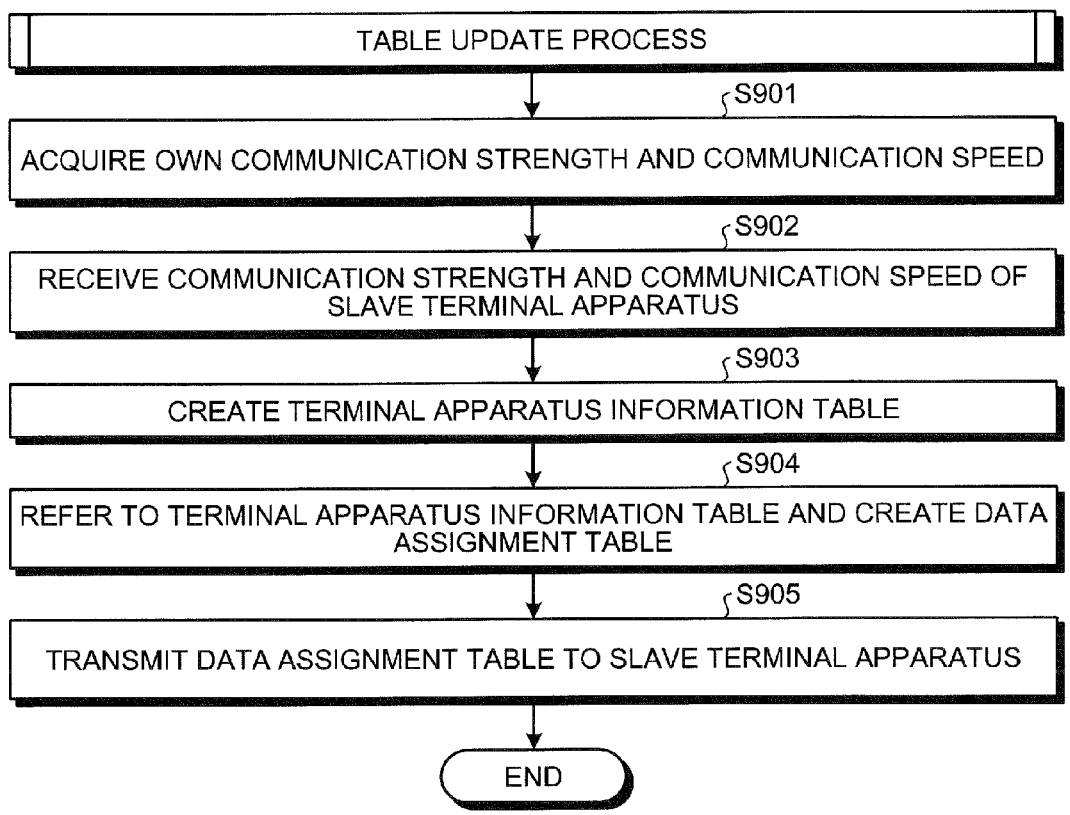
FIG. 9 is a flowchart of an example of a table update process procedure of the master terminal apparatus according to the first embodiment.

FIG. 9 is a flowchart of an example of a table update process procedure of the master terminal apparatus T1 according to the first embodiment. The table update process is a process executed by the CPU 301 of the master terminal apparatus T1.

In the table update process, the master terminal apparatus T1 acquires the communication strength Sti and the communication speed Spi thereof (step S901). The master terminal apparatus T1 receives the communication strength Sti and the communication speed Spi of the slave terminal apparatus T2 (step S902) and refers to the acquired and received communication strengths Sti and the communication speeds Spi to create the terminal apparatus information table 400 (step S903).

After step S903, the master terminal apparatus T1 refers to the terminal apparatus information table 400 and creates the data assignment table 500 (step S904). The master terminal apparatus T1 then transmits the created data assignment table 500 to the slave terminal apparatus T2 (step S905) and terminates the series of operations of this flowchart.

By executing the table update process, the master terminal apparatus T1 can update the terminal apparatus information table 400 and the data assignment table 500 with the communication strength Sti and the communication speed Spi in the latest communication state. As a result, the master terminal apparatus T1 can perform the assignment of the process and the assignment of the shared data D with consideration of the latest communication state.

Figure 10:
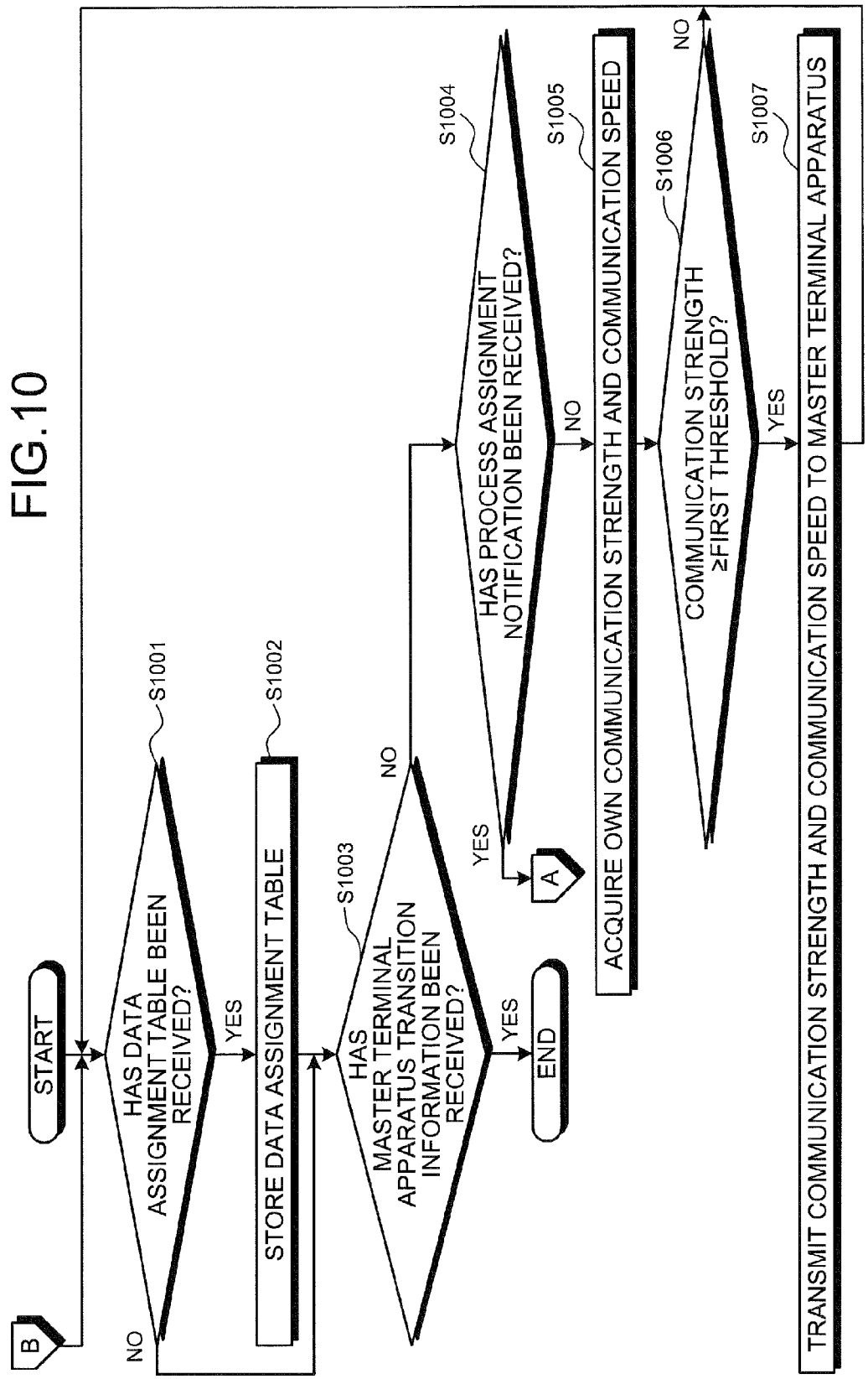
FIGS. 10 and 11 are flowcharts of an example of a slave terminal process procedure of the slave terminal apparatus according to the first embodiment.
Figure 11:
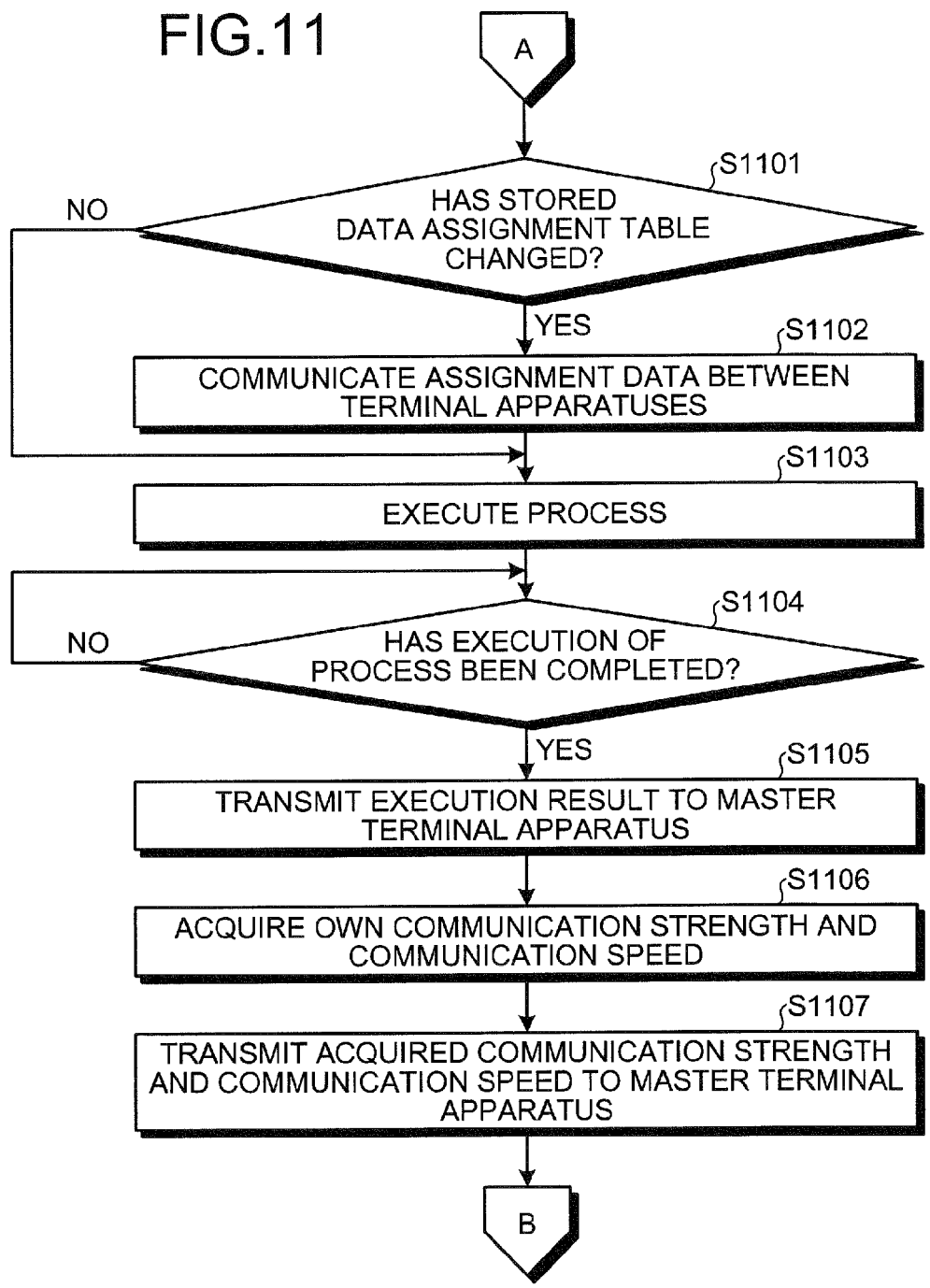

FIGS. 10 and 11 are flowcharts of an example of a slave terminal process procedure of the slave terminal apparatus T2 according to the first embodiment. The slave terminal process is a process executed by the CPU 301 of the slave terminal apparatus T2.

In the slave terminal process, the slave terminal apparatus T2 determines whether the data assignment table 500 has been received from the master terminal apparatus T1 (step S1001). If the data assignment table 500 has been received (step S1001: YES), the slave terminal apparatus T2 stores the received data assignment table 500 (step S1002).

If the data assignment table 500 has not been received at step S1001 (step S1001: NO), or after step S1002, the slave terminal apparatus T2 determines whether the master terminal apparatus transition information has been received from the master terminal apparatus T1 (step S1003). If the master terminal apparatus transition information has been received (step S1003: YES), the slave terminal apparatus T2 terminates the series of operations of this flowchart and executes the master terminal process described with reference to FIG. 8. As a result, the slave terminal apparatus T2 changes to the master terminal apparatus T1.

If the master terminal apparatus transition information has not been received from the master terminal apparatus T1 at step S1003 (step S1003: NO), the slave terminal apparatus T2 determines whether process assignment notification has been received from the master terminal apparatus T1 (step S1004). If process assignment notification has not been received (step S1004: NO), the slave terminal apparatus T2 acquires the communication strength Sti and the communication speed Spi thereof (step S1005) and determines if the communication strength Sti is greater than or equal to the first threshold (step S1006).

If the communication strength Sti is greater than or equal to the first threshold at step S1006 (step S1006: YES), the slave terminal apparatus T2 transmits the acquired communication strength Sti and communication speed Spi thereof to the master terminal apparatus T1 (step S1007). After step S1007, the slave terminal apparatus T2 proceeds to step S1001. If the communication strength Sti is less than the first threshold at step S1006 (step S1006: NO), the slave terminal apparatus T2 proceeds to step S1001.

At step S1004, the slave terminal apparatus T2 not receiving process assignment notification is the slave terminal apparatus T2 without an assigned process, i.e., a terminal apparatus 101-i registered in the terminal apparatus information table 400 and having a communication strength Sti that is less than the first threshold. Therefore, by executing steps S1005 to S1007, if the slave terminal apparatus T2 having a communication strength Sti that is less than the first threshold, recovers to have a communication strength Sti that is greater than or equal to the first threshold, the master terminal apparatus T1 is notified of the recovery.

If process assignment notification has been received from the master terminal apparatus T1 at step S1004 (step S1004: YES), the slave terminal apparatus T2 determines whether the stored data assignment table 500 has changed (step S1101). In this case, for example, the slave terminal apparatus T2 accesses the master terminal apparatus T1 to determine whether the change flag is set to ON and thereby determines whether the data assignment table 500 has changed.

If the data assignment table 500 has changed at step S1101 (step S1101: YES), the slave terminal apparatus T2 performs the transmission/reception of the assignment data between the terminal apparatuses (step S1102). In this case, the slave terminal apparatus T2 refers to the data assignment table 500 stored in the master terminal apparatus T1 to perform the transmission/reception of the assignment data between the terminal apparatuses.

After step S1102, or if the data assignment table 500 has not changed at step S1101 (step S1101: NO), the slave terminal apparatus T2 executes the process corresponding to the received process assignment notification (step S1103). The slave terminal apparatus T2 determines whether the execution of the process has been completed (step S1104) and if not (step S1104: NO), the slave terminal apparatus T2 waits until completion.

If the execution of the process has been completed at step S1104 (step S1104: YES), the slave terminal apparatus T2 transmits the execution result of the process to the master terminal apparatus T1 (step S1105). The slave terminal apparatus T2 acquires the communication strength Sti and the communication speed Spi thereof (step S1006). The slave terminal apparatus T2 then transmits the acquired communication strength Sti and communication speed Spi thereof to the master terminal apparatus T1 (step S1107) and proceeds to step S1001.

By executing the slave terminal process, the slave terminal apparatus T2 can execute the process assigned by the master terminal apparatus T1 based on the communication strength Sti.

According to the scheduling method and the task processing method of the first embodiment described above, the process that uses the shared data D is assigned based on the communication strength Sti between a terminal apparatus 101-i and the base station 102. As a result, the process can be assigned to a terminal apparatus 101-i in stable communication. Therefore, the possibility of interruption of communication of the terminal apparatus during execution of the process can be reduced and a lack of a process result due to an inability to synchronize the process results can be avoided, enabling completion of the process that uses the shared data D.

According to the scheduling method and the task processing method of the first embodiment, the shared data D is assigned based on the communication strength Sti between a terminal apparatus 101-i and the base station 102. As a result, the shared data D can be assigned to a terminal apparatus 101-i in stable communication. Therefore, since the communication of the terminal apparatus storing the shared data D is not interrupted, a lack of a process result due to an inability to access the shared data D can be avoided, enabling completion of the process that uses the shared data D.

According to the scheduling method and the task processing method of the first embodiment, the process is assigned to a terminal apparatus 101-i having a communication strength Sti that is greater than or equal to the first threshold. As a result, the process can be assigned to a terminal apparatus 101-i with a lower possibility of interruption of communication. Therefore, the possibility of a lack of a process result due to an inability to synchronize the process results can be further reduced and a lack of the process result due to an inability to synchronize the process results can be avoided, enabling completion of the process that uses the shared data D.

According to the scheduling method and the task processing method of the first embodiment, the shared data D is assigned to a terminal apparatus 101-i having a communication strength Sti that is greater than or equal to the first threshold. As a result, the shared data D can be assigned to a terminal apparatus 101-i with a lower possibility of interruption of communication and the possibility of a lack of a process result due to an inability to access the shared data D can be reduced, enabling completion of the process that uses the shared data D.

According to the scheduling method and the task processing method of the first embodiment, a process can be assigned to multiple terminal apparatuses to distribute the load applied to the CPU 301 due to the process. The shared data D can be assigned to multiple terminal apparatuses to distribute the communication load when the shared data D is accessed.

According to the scheduling method and the task processing method of the first embodiment, the shared data D of a larger size is assigned to a terminal apparatus 101-i having a larger value of the communication speed Spi. As a result, the time consumed for transmission/reception of the shared data D can be reduced. Therefore, while a reduction width of the communication strength Sti during execution of the process is as small as possible, the process can be executed efficiently.

A second embodiment of the scheduling method and the task processing method will be described. The second embodiment is different from the first embodiment in that the master terminal apparatus T1 assigns a process to a slave terminal apparatus T2 having a communication strength Sti that is less than the first threshold. The second embodiment is different from the first embodiment in that if the communication strength Sti of the slave terminal apparatus T2 assigned a process from the master terminal apparatus T1 falls below a second threshold, the master terminal apparatus T1 takes over the assigned process. As a result, the load due to the process is distributed and even if the communication state deteriorates at any of the terminal apparatuses 101-i, the process that uses the shared data D can be completed. Portions identical to portions described in the first embodiment will not be described.

Figure 12:
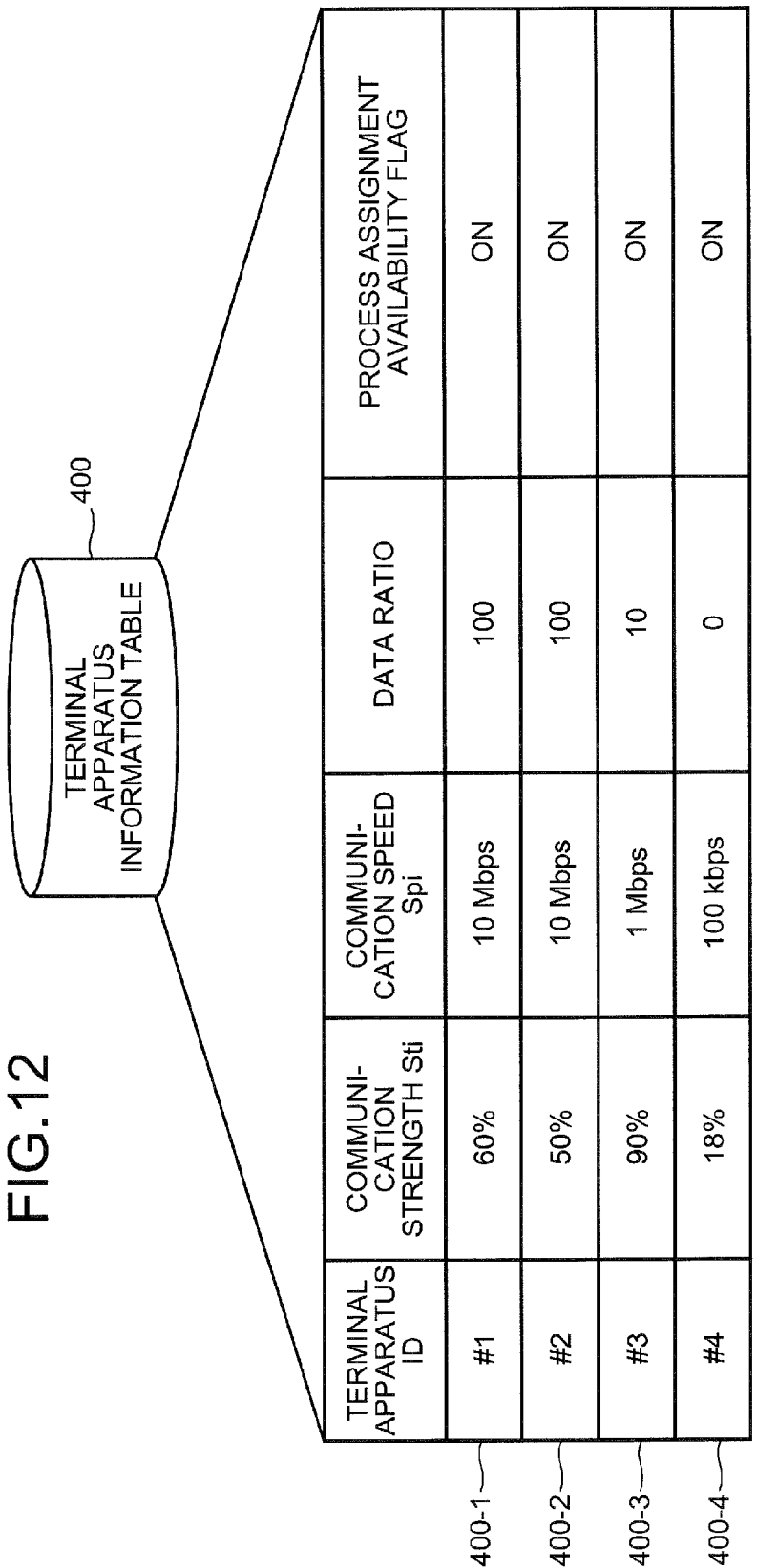
FIG. 12 is an explanatory view of an example of the contents of the terminal apparatus information table of a second embodiment.

FIG. 12 is an explanatory view of an example of the contents of the terminal apparatus information table 400 of the second embodiment. In FIG. 12, as described with reference to FIG. 4, the terminal apparatus information table 400 included in the terminal apparatus 101-i has the fields of the terminal apparatus ID, the communication strength Sti, the communication speed Spi, the data ratio, and the process assignment availability flag. As depicted, in the terminal apparatus information table 400 of the second embodiment, even the terminal apparatus property data 400-4 of the terminal apparatus 101-4 having a communication strength Sti that is less than the first threshold has the process assignment availability flag set to ON.

An example of functions of the master terminal apparatus T1 and the slave terminal apparatus T2 according to the second embodiment will be described with reference to FIG. 7. Functional units (the receiving unit 711, the creating unit 712, the process assigning unit 713, and the executing unit 714) having functions different from the master terminal apparatus T1 according to the first embodiment will be described.

The receiving unit 711 receives execution context of a process from the third apparatus based on a change in the communication strength Sti of the third apparatus. The execution context is data used for continuing an app such as a value of a program counter, which is one of registers of the CPU, a value of a general-purpose register storing a value of a variable, etc. and a value of a stack pointer. For example, the receiving unit 711 receives execution context transmitted from the transmitting unit 724 of the slave terminal apparatus T2.

The creating unit 712 registers ON as the process assignment availability flag of a terminal apparatus 101-i having a communication strength Sti that is less than the first threshold. For example, in the terminal apparatus property data 400-4 of the terminal apparatus information table 400 of FIG. 12, the creating unit 712 registers ON as the process assignment availability flag because the communication strength St3 is less than 20 [%].

When the communication strength Sti of the third apparatus included in the multiple terminal apparatuses 101-1 to 101-m is less than the first threshold, the process assigning unit 713 assigns a process to the third apparatus. For example, the process assigning unit 713 refers to the terminal apparatus information table 400 and assigns a process to a terminal apparatus 101-i having a process assignment availability flag set to "ON", i.e., a terminal apparatus 101-i having a communication strength Sti that is less than the first threshold. In the example of FIG. 12, the process assigning unit 713 assigns the process to the terminal apparatus 101-4.

The executing unit 714 executes the process based on the execution context received by the receiving unit 711. For example, based on the received execution context, the executing unit 714 identifies an unexecuted process among the processes assigned to the third apparatuses and executes the identified process. As a result, the master terminal apparatus T1 can continue the process assigned to the slave terminal apparatus T2 in a deteriorated communication state.

As described above, the master terminal apparatus T1 according to the second embodiment receives information (e.g., execution context) of a process under execution from a terminal apparatuses 101-i assigned the process that uses the shared data. In this case, for example, the master terminal apparatus T1 receives the information of the process under execution from a terminal apparatus 101-i having a communication strength Sti that is less than the first threshold.

Based on the received information of the process under execution, the master terminal apparatus T1 assigns the process under execution to a terminal apparatus different from the terminal apparatus that is the transmission source of the information of the process under execution. For example, the master terminal apparatus T1 assigns the process under execution to the master terminal apparatus T1. As a result, the process partially executed by one terminal apparatus can be taken over and executed by another terminal apparatus. Therefore, if the communication state of the one terminal apparatus deteriorates, the process can be continued.

Functional units (the acquiring unit 723 and the transmitting unit 724) having functions different from the slave terminal apparatus T2 according to the first embodiment will be described.

When the slave terminal apparatus T2 executes a task, the acquiring unit 723 acquires the communication strength Sti of the slave terminal apparatus T2 at a predetermined cycle. When a process is being executed by the executing unit 722 and the communication strength Sti acquired by the acquiring unit 723 is less than the first threshold, the transmitting unit 724 transmits the communication strength Sti to the master terminal apparatus T1. As a result, if the communication state deteriorates during execution of the assigned process, the slave terminal apparatus T2 can cause the master terminal apparatus T1 to terminate the assignment of the process to the slave terminal apparatus T2.

When the second apparatus executes a task, if the communication strength Sti of the second apparatus is less than the second threshold, the transmitting unit 724 transmits the execution context of the task to the first apparatus. The second threshold is defined as 5 [%] in this embodiment and is a value different from the first threshold; however, this is not a limitation and the second threshold may be the same value. For example, the transmitting unit 724 first determines whether the communication strength Sti of the slave terminal apparatus T2 is less than the second threshold and if it is determined that the communication strength Sti of the slave terminal apparatus T2 is less than the second threshold, the transmitting unit 724 transmits the execution context of the task to the first apparatus. As a result, even if the communication strength Sti is less than the second threshold and the communication state of the slave terminal apparatus T2 assigned the process deteriorates, another terminal apparatus can be caused to take over the process, and the process can be continued.

As described above, the slave terminal apparatus T2 according to the second embodiment acquires the communication strength Sti thereof and determines whether the acquired communication strength Sti is less than the second threshold. If the communication strength Sti of the slave terminal apparatus T2 during execution of the assigned process is less than the second threshold, the slave terminal apparatus T2 transmits the information of the process under execution to another terminal apparatus. As a result, the process partially executed by one terminal can be taken over and executed by another apparatus. Therefore, even if the communication state of the one terminal apparatus deteriorates, the process can be continued.

Figure 13:
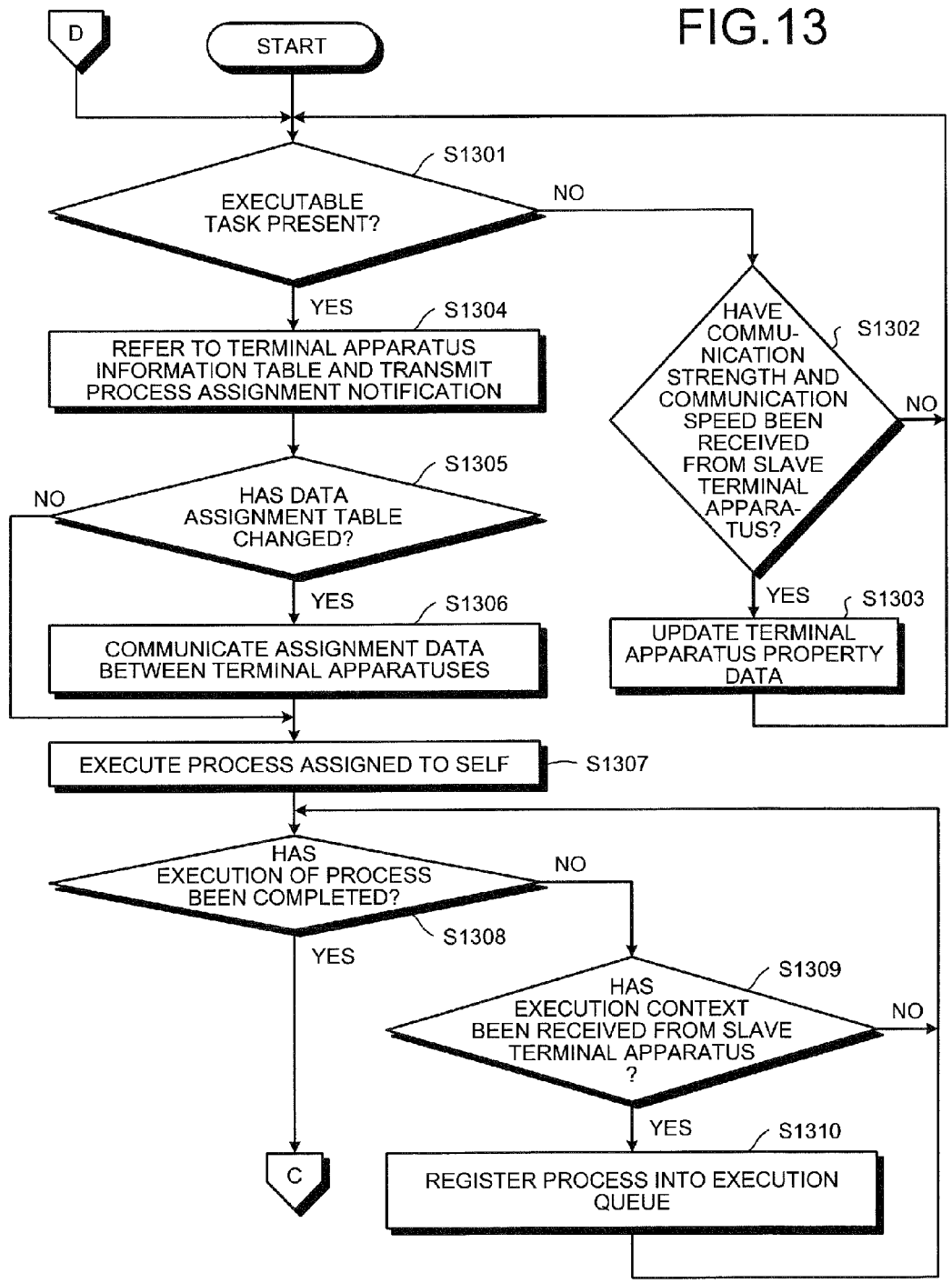
FIGS. 13 and 14 are flowcharts of an example of a master terminal process procedure of the master terminal apparatus according to the second embodiment.
Figure 14:
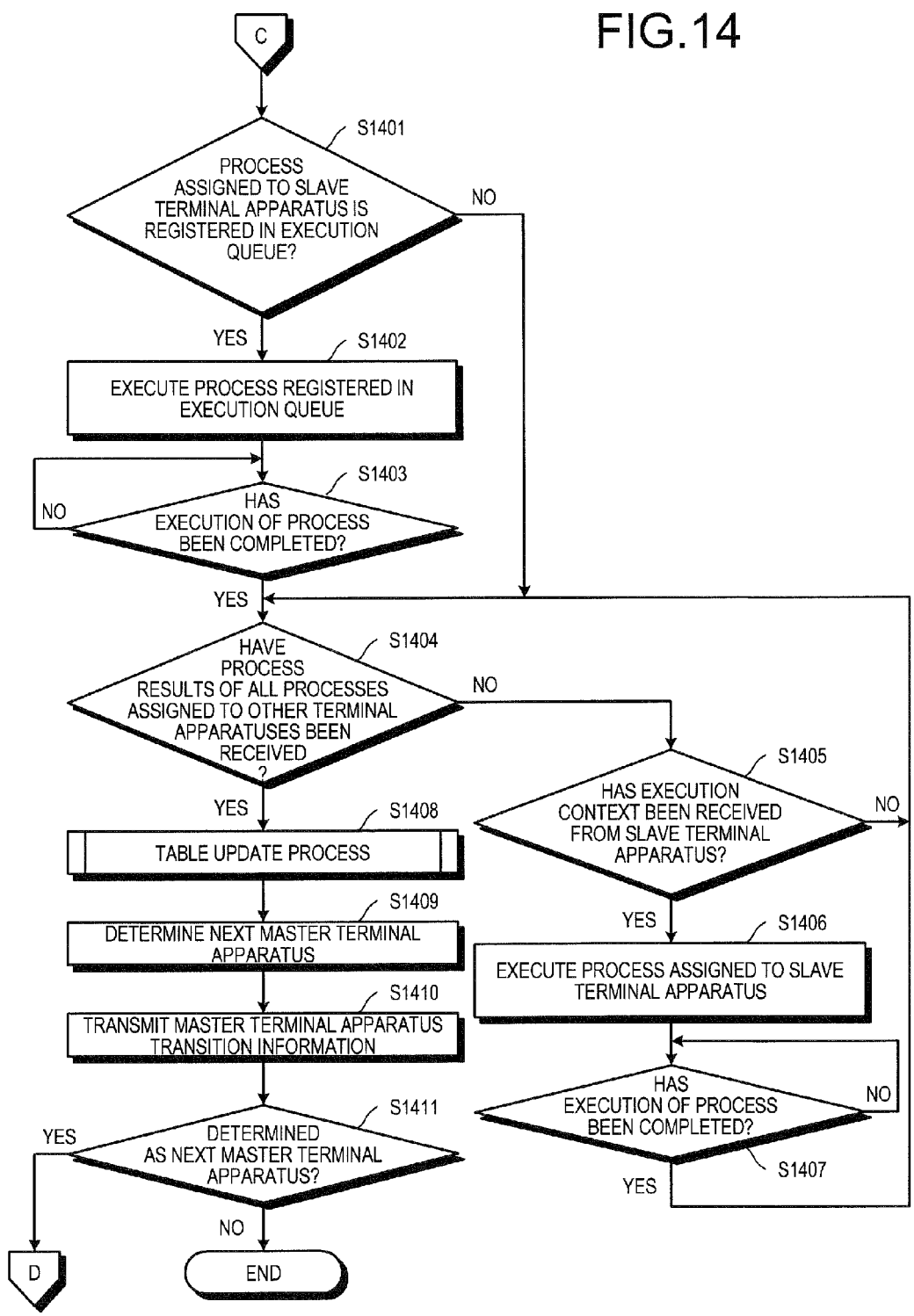

FIGS. 13 and 14 are flowcharts of an example of a master terminal process procedure of the master terminal apparatus T1 according to the second embodiment. The master terminal process is a process executed by the CPU 301 of the master terminal apparatus T1.

In the master terminal process, the master terminal apparatus T1 determines whether a task in an executable state is present (step S1301). If no task in an executable state is present (step S1301: NO), the master terminal apparatus T1 determines whether the communication strength Sti and the communication speed Spi have been received from the slave terminal apparatus T2 (step S1302).

If the communication strength Sti and the communication speed Spi have been received from the slave terminal apparatus T2 (step S1302: YES), the master terminal apparatus T1 updates the terminal apparatus property data 400-i of the terminal apparatus information table 400 (step S1303) and proceeds to step S1301. If the communication strength Sti and the communication speed Spi have not been received from the slave terminal apparatus T2 at step S1302 (step S802: NO), the master terminal apparatus T1 proceeds to step S1301.

If a task in an executable state is present at step S1301 (step S1301: YES), the master terminal apparatus T1 refers to the terminal apparatus information table 400 and transmits process assignment notification to the slave terminal apparatus T2 to which the process is to be assigned (step S1304). In this case, the master terminal apparatus T1 registers into an execution queue, the process to be assigned to the master terminal apparatus T1.

The master terminal apparatus T1 then determines whether the data assignment table 500 has changed (step S1305). For example, the master terminal apparatus T1 determines whether a change flag that indicates a change in the data assignment table 500 is set to ON and thereby, determines whether the data assignment table 500 has changed. In this case, for example, the master terminal apparatus T1 sets the change flag to ON when the data assignment table 500 is updated, and sets the change flag to OFF when it is determined that the data assignment table 500 has changed.

If it is determined that the data assignment table 500 has changed at step S1305 (step S1305: YES), the master terminal apparatus T1 refers to the data assignment table 500 to perform the transmission/reception of the assignment data between the terminal apparatuses (step S1306). As a result, the master terminal apparatus T1 assigns the shared data D.

After step S1306, or if it is determined at step S1305 that the data assignment table 500 has not changed (step S1305: NO), the master terminal apparatus T1 executes the process assigned thereto (step S1307). The master terminal apparatus T1 determines whether the execution of the process has been completed (step S1308) and if not (step S1308: NO), the master terminal apparatus T1 determines whether execution context has been received from the slave terminal apparatus T2 (step S1309).

If execution context has been received from the slave terminal apparatus T2 at step S1309 (step S1309: YES), the master terminal apparatus T1 registers the process into the execution queue based on the received execution context (step S1310). In this case, the master terminal apparatus T1 registers a process not executed by the slave terminal apparatus T2 into the execution queue among the processes assigned to the slave terminal apparatus T2 that is the transmission source of the execution context.

After step S1310, the master terminal apparatus T1 proceeds to step S1308. If the execution context has not been received from the slave terminal apparatus T2 at step S1309 (step S1309: NO), the master terminal apparatus T1 proceeds to step S1308.

At step S1308, if the process assigned to the master terminal apparatus T1 has been completed (step S1308: YES), the master terminal apparatus T1 determines whether the process assigned to the slave terminal apparatus T2 is registered in the execution queue (step S1401). If the process assigned to the slave terminal apparatus T2 is registered in the execution queue (step S1401: YES), the master terminal apparatus T1 executes the process registered in the execution queue (step S1402). Therefore, the master terminal apparatus T1 takes over from the slave terminal apparatus T2 and executes the process that has not been executed by the slave terminal apparatus T2 among the processes assigned to the slave terminal apparatus T2. The master terminal apparatus T1 determines whether the execution of the process executed at step S1402 has been completed (step S1403) and if not (step S1403: NO), the master terminal apparatus T1 waits until completion.

If the execution of the process has been completed at step S1403 (step S1403: YES), the master terminal apparatus T1 determines whether the process results of all the processes assigned to the other terminal apparatuses have been received (step S1404). If no process assigned to the slave terminal apparatus T2 is registered in the execution queue at step S1401 (step S1401: YES), the master terminal apparatus T1 proceeds to step S1404.

If the process results of all the processes assigned to the other terminal apparatuses have not been received at step S1404 (step S1404: NO), the master terminal apparatus T1 determines whether execution context has been received from the slave terminal apparatus T2 (step S1405). If execution context has been received from the slave terminal apparatus T2 (step S1405: YES), the master terminal apparatus T1 executes the process assigned to the slave terminal apparatus T2 based on the execution context (step S1406). The master terminal apparatus T1 then determines whether the execution of the process executed at step S1406 has been completed (step S1407) and if not (step S1407: NO), the master terminal apparatus T1 waits until completion.

If execution context has not been received from the slave terminal apparatus T2 at step S1405 (step S1405: NO), the master terminal apparatus T1 proceeds to step S1404. If the execution of the process has been completed at step S1407 (step S1407: NO), the master terminal apparatus T1 proceeds to step S1404.

If the process results of all the processes assigned to the other terminal apparatuses have been received at step S1404 (step S1404: YES), the master terminal apparatus T1 executes the table update process (step S1408).

The master terminal apparatus T1 then refers to the terminal apparatus information table 400 to determine the terminal apparatus 101-i having the largest value of the communication strength Sti as the next master terminal apparatus T1 (step S1409). The master terminal apparatus T1 transmits the master terminal apparatus transition information to the terminal apparatus 101-i determined as the next master terminal apparatus T1 (step S1410).

After step S1410, the master terminal apparatus T1 determines whether the terminal apparatus 101-i determined as the next master terminal apparatus T1 is the master terminal apparatus T1 (step S1411). If the master terminal apparatus T1 in the next process is the master terminal apparatus T1 (step S1411: YES), the master terminal apparatus T1 proceeds to step S1301. If the master terminal apparatus T1 in the next process is not the master terminal apparatus T1 (step S1411: NO), the master terminal apparatus T1 terminates the series of operations of this flowchart. If the series of operations of this flowchart is terminated, the master terminal apparatus T1 changes to the slave terminal apparatus T2 to execute the slave terminal process described above.

By executing the master terminal process, the master terminal apparatus T1 executes the process based on the execution context received from the slave terminal apparatus T2. As a result, the process assigned to the slave terminal apparatus T2 can be executed continuously.

Figure 15:
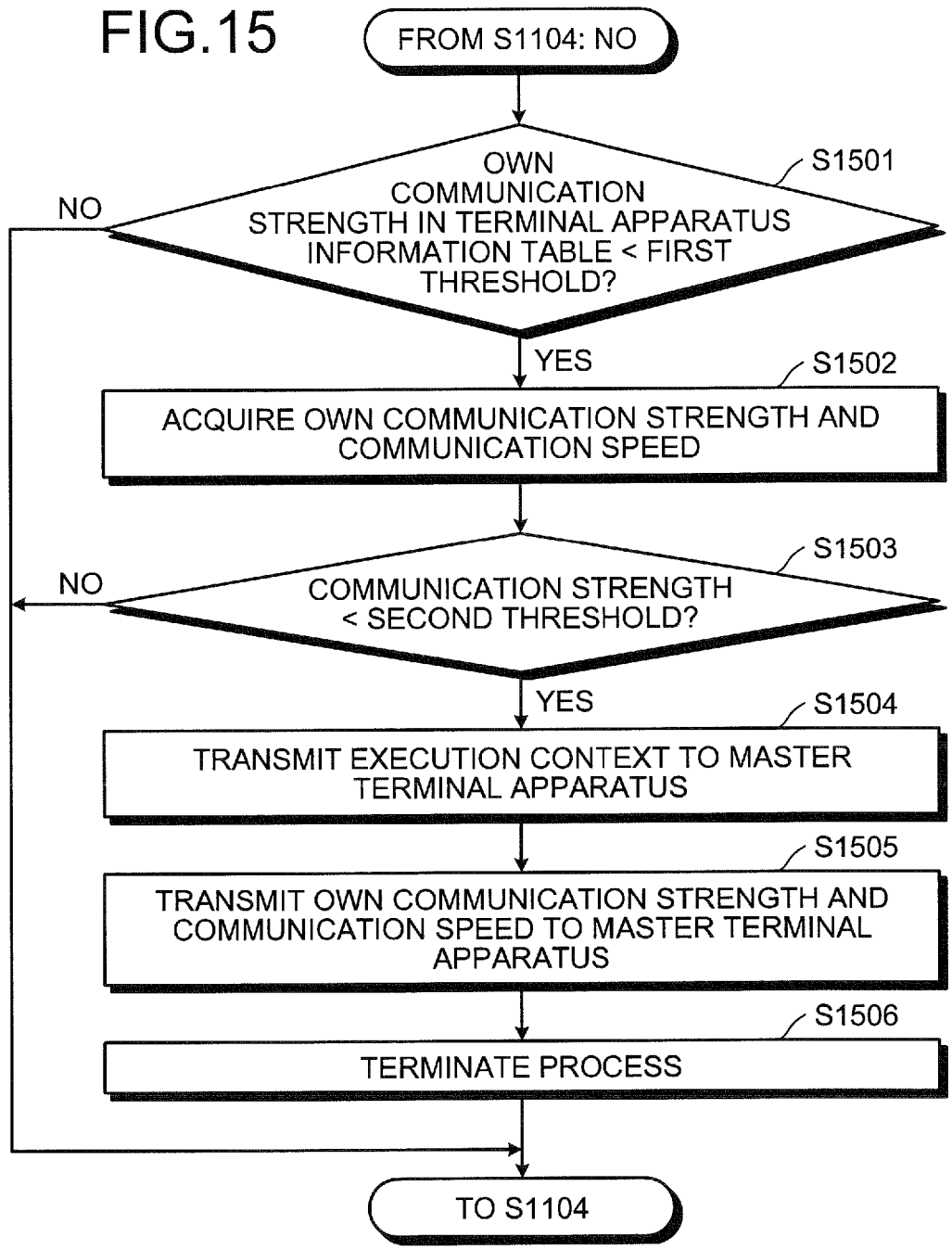
FIG. 15 is a flowchart of an example of a slave executing process procedure of the slave terminal apparatus according to the second embodiment.

FIG. 15 is a flowchart of an example of a slave executing process procedure of the slave terminal apparatus T2 according to the second embodiment. The slave executing process depicted in FIG. 15 is a process executed by the slave terminal apparatus T2 if the execution of the process has not been completed at step S1104 of FIG. 11 (step S1104: NO).

In the slave executing process, the slave terminal apparatus T2 determines whether the communication strength Sti thereof in the terminal apparatus information table 400 is less than the first threshold (step S1501). In this case, the slave terminal apparatus T2 accesses a storage area of the master terminal apparatus T1 and refers to the terminal apparatus information table 400 stored in the storage area to determine whether the communication strength Sti of the slave terminal apparatus T2 is less than the first threshold.

If the communication strength Sti of the slave terminal apparatus T2 in the terminal apparatus information table 400 is less than the first threshold at step S1501 (step S1501: YES), the slave terminal apparatus T2 executes step S1502. At step S1502, the slave terminal apparatus T2 acquires the communication strength Sti and the communication speed Spi thereof (step S1502). If the communication strength Sti of the slave terminal apparatus T2 in the terminal apparatus information table 400 is less than the first threshold at step S1501, this means that the slave terminal apparatus T2 is the terminal apparatus 101-4 having a communication strength Sti less than the first threshold and assigned a process. After step S1502, the slave terminal apparatus T2 determines whether the acquired communication strength Sti is less than the second threshold (step S1503).

If the acquired communication strength Sti is less than the second threshold at step S1503 (step S1503: YES), the slave terminal apparatus T2 transmits execution context to the master terminal apparatus T1 (step S1504). If the acquired communication strength Sti is less than the second threshold at step S1503, this means that the communication state has deteriorated at the terminal apparatus 101-4 that is the slave terminal apparatus T2.

After step S1504, the slave terminal apparatus T2 transmits the communication strength Sti and the communication speed Spi of the slave terminal apparatus T2 to the master terminal apparatus T1 (step S1505), terminates the process under execution (step S1506), and proceeds to step S1104.

In the terminal apparatus information table 400, if the communication strength Sti of the slave terminal apparatus T2 is less than the first threshold at step S1501 (step S1501: NO), the slave terminal apparatus T2 proceeds to step S1104. If it is determined that the acquired communication strength Sti is greater than or equal to the second threshold at step S1503 (step S1503: NO), the slave terminal apparatus T2 proceeds to step S1104.

By executing the slave executing process described above, if the communication strength Sti falls below the second threshold, the slave terminal apparatus T2 can transmit the execution context to the master terminal apparatus T1. As a result, the process being executed by the slave terminal apparatus T2 in a deteriorated communication condition can be taken over by the master terminal apparatus T1. Therefore, the load due to the process can be distributed until the communication strength Sti falls below the second threshold and even if the communication strength Sti falls below the second threshold, the process can be continued.

According to the scheduling method and the task processing method of the second embodiment described above, the master terminal apparatus T1 executes a process based on execution context received from the slave terminal apparatus T2. As a result, the master terminal apparatus T1 can take over and execute the process assigned to the slave terminal apparatus T2.

According to the scheduling method and the task processing method of the second embodiment, if the communication strength Sti falls below the second threshold, the slave terminal apparatus T2 can transmit the execution context to the master terminal apparatus T1. As a result, the process being executed by the slave terminal apparatus T2 in a deteriorated communication condition can be taken over by the master terminal apparatus T1. Therefore, the load due to the process can be distributed until the communication strength Sti falls below the second threshold and even if the communication strength Sti falls below the second threshold, the process can be continued and completed.

A third embodiment of the scheduling method and the task processing method according to the present invention will be described. The third embodiment is different from the first and second embodiments in that the shared data D is assigned to a terminal apparatus 101-i having a communication strength Sti that is less than the first threshold. In this case, backup data is stored in another terminal apparatus for the shared data D assigned to the terminal apparatus 101-i having a communication strength Sti that is less than the first threshold. As a result, the load of the network due to access to another terminal apparatus is reduced and even if the communication state deteriorates at the terminal apparatus 101-i having a communication strength Sti that is less than the first threshold, the process using the backup data can be continued and completed. Portions identical to portions described in the first and second embodiments will not be described.

FIG. 16 is an explanatory view of an example of the contents of the terminal apparatus information table 400 of the third embodiment. In FIG. 16, as described with reference to FIG. 4, the terminal apparatus information table 400 included in the terminal apparatus 101-i has the fields of the terminal apparatus ID, the communication strength Sti, the communication speed Spi, the data ratio, and the process assignment availability flag.

As depicted, in the terminal apparatus information table 400 of the third embodiment, the terminal apparatus property data 400-4 of the terminal apparatus 101-4 having a communication strength Sti that is less than the first threshold has a data ratio of "1". The terminal apparatus property data 400-3 of the terminal apparatus 101-3 having a communication strength Sti that is greater than or equal to the first threshold has a data ratio of "11 (10+1)". The data ratio of "11 (10+1)" indicates the storage of the shared data D corresponding to a data ratio "10" assigned according to a ratio of the communication speed Spi and a data ratio "1" for the backup of another terminal apparatus.

Figure 17:
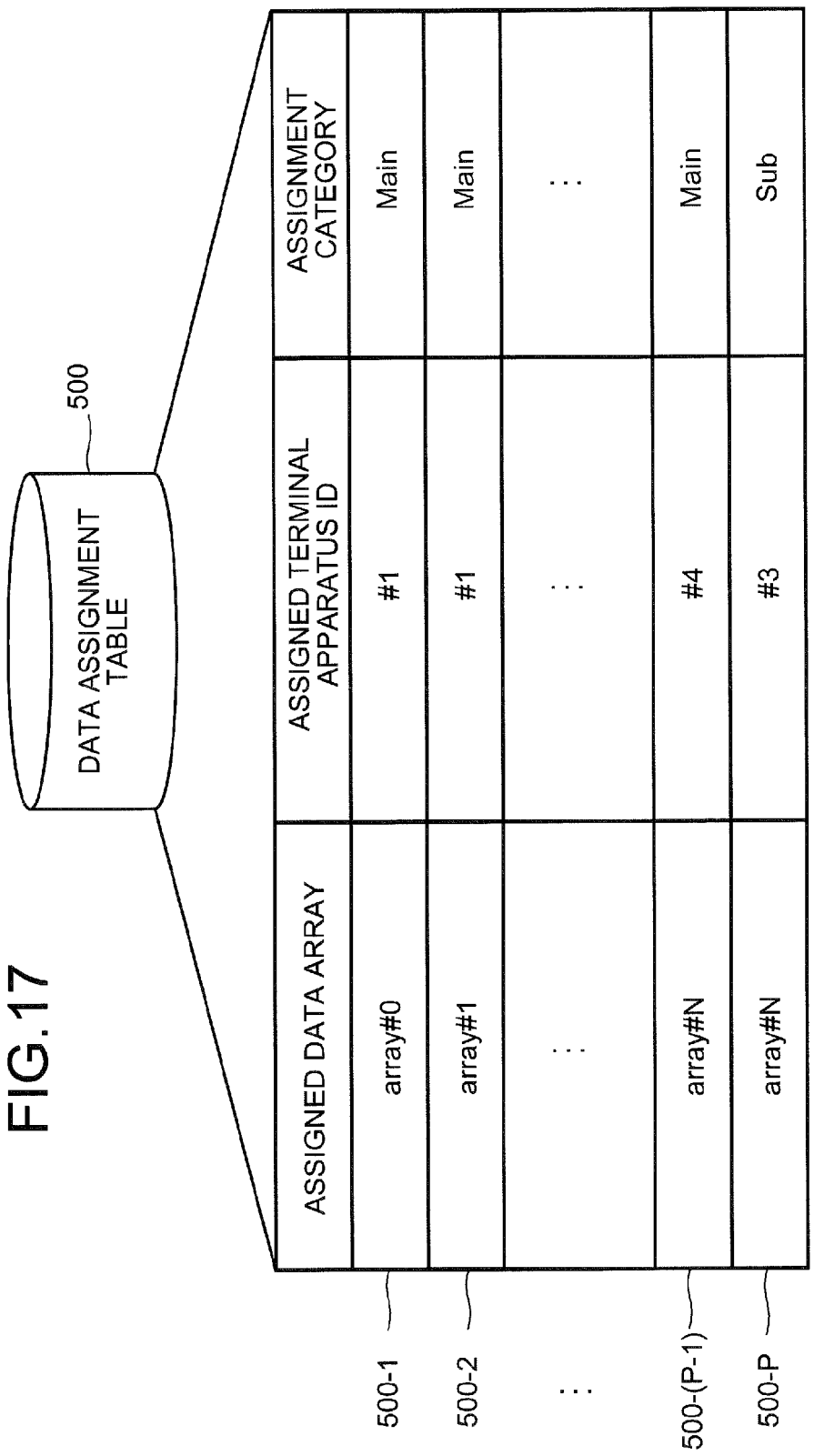
FIG. 17 is an explanatory view of an example of the contents of the data assignment table of the third embodiment.

FIG. 17 is an explanatory view of an example of the contents of the data assignment table 500 of the third embodiment. In FIG. 17, the data assignment table 500 included in the terminal apparatus 101-i has fields of the assigned data array, the assigned terminal apparatus ID, and an assignment category. By setting information in the fields, the data assignment property data 500-1 to 500-P are stored as records.

The assigned data array and the assigned terminal apparatus ID are as described with reference to FIG. 5. The assignment category indicates a category of assignment data to be assigned. For example, the assignment category of the assignment data to be assigned according to the communication speed Spi is "Main" and the assignment category of the assignment data to be assigned for backup is "Sub".

For example, in the case of data assignment property data 500-1, the assigned data array "array #0", the assigned terminal apparatus ID "#1", and the assignment category "Main" are stored. Since the communication strength St4 is less than the first threshold, the assigned data array "array#N" assigned to the terminal apparatus 101-4 is also stored in the terminal apparatus 101-3 having the assigned terminal apparatus ID "#3" as indicated by data assignment property data 500-P. The assignment category in this case is "Sub".

Figure 18:
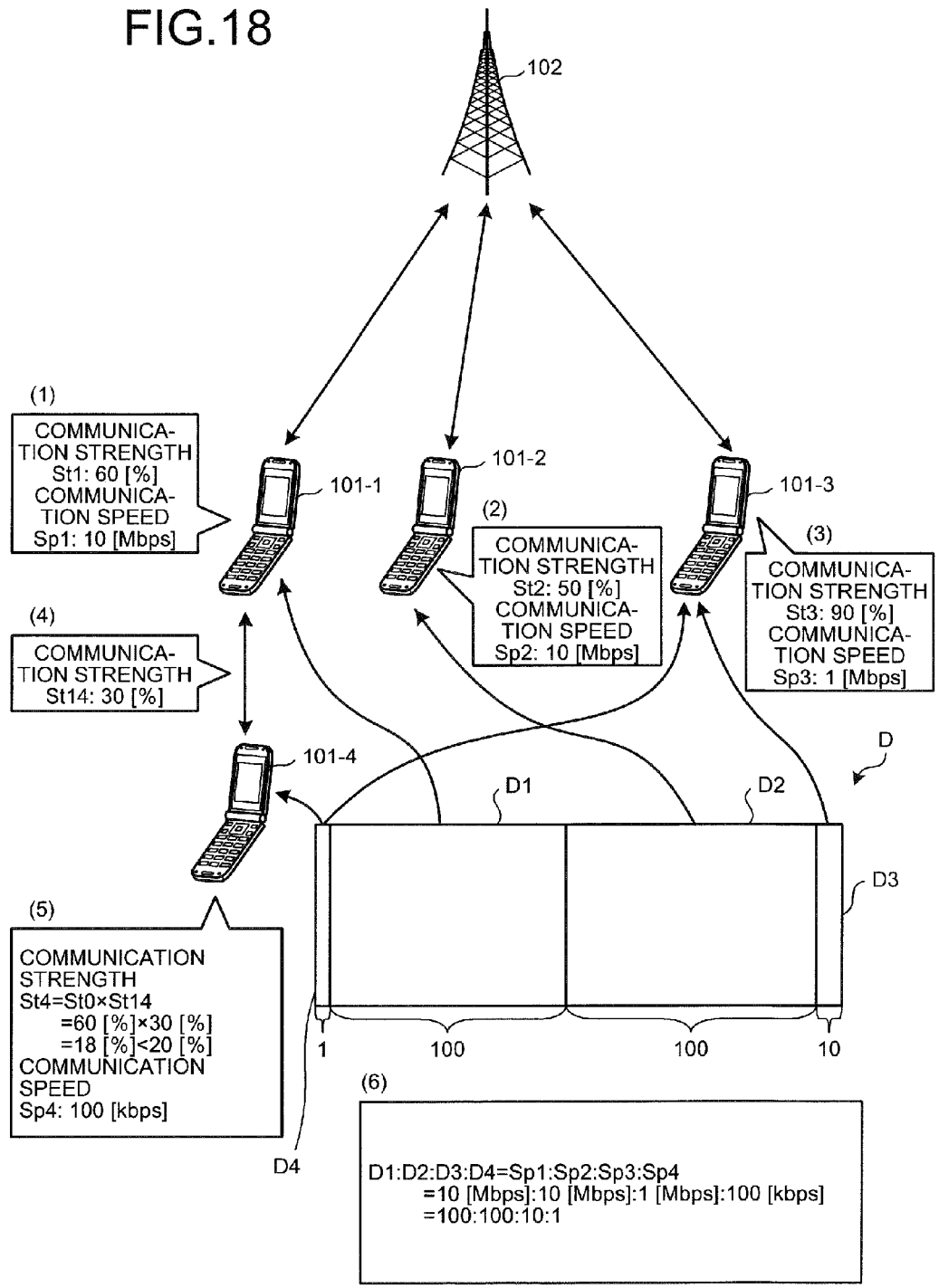
FIG. 18 is an explanatory view of an example of a method of assigning the shared data in the third embodiment.

FIG. 18 is an explanatory view of an example of a method of assigning the shared data D in the third embodiment. In the method of assigning the shared data D depicted in FIG. 17, the master terminal apparatus T1 acquires the communication strength Sti between the terminal apparatuses and the base station 102, and the communication speed Spi of the terminal apparatuses. For example, as with (1) to (5) described with reference to FIG. 6, the master terminal apparatus T1 acquires the communication strength Sti between the terminal apparatuses and the base station 102, and the communication speed Spi of the terminal apparatuses.

The master terminal apparatus T1 assigns the shared data D to the terminal apparatuses in proportion corresponding to the ratio of the communication speed Spi of the terminal apparatus 101-i. For example, as depicted, (6) the ratio of the assigned data D1, the assigned data D2, the assigned data D3, and the assigned data D4 is the ratio of the communication speed Spi, the communication speed Sp2, the communication speed Sp3, and the communication speed Sp4. Sp1:Sp2:Sp3:Sp4 is 10 [Mbps]: 10 [Mbps]: 1 [Mbps]: 100 [kbps]. Therefore, the ratio of the assigned data D1, the assigned data D2, the assigned data D3, and the assigned data D4 is obtained as 100:100:10:1.

The assigned data D4 assigned to the terminal apparatus 101-4 having a communication strength sti that is less than the first threshold is assigned as a backup to a terminal apparatus 101-i other than the terminal apparatus 101-4. In this case, the assigned data D4 is assigned to the terminal apparatus 101-3 having the highest communication strength sti as a backup. As a result, the backup can be given to the terminal apparatus 101-3 with the lowest possibility of interruption of communication, and the possibility of termination of the process can be lowered.

The master terminal apparatus T1 registers the obtained ratio into the terminal apparatus information table 400. The master terminal apparatus T1 creates the data assignment table 500 according to the terminal apparatus information table 400 and assigns the shared data D to the terminal apparatuses depending on the created data assignment table 500.

An example of functions of the master terminal apparatus T1 and the slave terminal apparatus T2 according to the third embodiment will be described with reference to FIG. 7. The functional units (the creating unit 712, the process assigning unit 713, and the data assigning unit 715) having functions different from the master terminal apparatus T1 according to the first and second embodiments will be described.

The creating unit 712 registers into the terminal apparatus information table 400, information that indicates assignment of backup data of the assignment data assigned to the terminal apparatus 101-i having a communication strength Sti that is lower than the first threshold, as terminal apparatus information property data corresponding to a fourth apparatus. For example, the creating unit 712 registers the data ratio "11 (10+1)" with consideration of the backup data as in the terminal apparatus property data 400-3 corresponding to the fourth apparatus of FIG. 16.

The creating unit 712 creates the data assignment table 500 with consideration of the backup data. For example, the creating unit 712 registers the assigned data array stored in the terminal apparatus 101-i having a communication strength Sti that is lower than the first threshold, as the assigned data array corresponding to the fourth apparatus. For example, the data assignment property data 500-(P-1) having the assignment category "Main" and the assigned terminal apparatus ID "#4", and the data assignment property data 500-P having the assignment category "Sub" and the assigned terminal apparatus ID "#3" are registered for the assigned data array "array#N".

When assigning the process, the data assigning unit 715 assigns data to the fourth apparatus included among the multiple terminal apparatuses. For example, the data assigning unit 715 assigns the shared data D to a terminal apparatus 101-i having a communication strength Sti that is lower than the first threshold and assigns to the fourth apparatus, the same assignment data assigned to the terminal apparatus.

In this case, for example, the data assigning unit 715 refers to the data assignment table 500 created by the creating unit 712 and assigns to the fourth apparatus, the same assignment data assigned to the terminal apparatus 101-i having a communication strength Sti that is lower than the first threshold. For example, the data assigning unit 715 assigns the shared data D to the terminal apparatus 101-4 having a communication strength Sti that is lower than the first threshold and assigns the same assignment data to any of the terminal apparatuses 101-1 to 101-3 other than the terminal apparatus 101-4.

As a result, the backup of the assignment data of the terminal apparatus 101-i having a communication strength Sti that is lower than the first threshold can be stored in another terminal apparatus. Therefore, even if the communication state deteriorates at the terminal apparatus 101-i having a communication strength Sti that is lower than the first threshold, the possibility of an inability to access the shared data D can be reduced. In this case, if the terminal apparatus 101-i assigned the backup data has a communication strength Sti that is greater than or equal to the first threshold, the possibility of an inability to access the backup data can be reduced.

The data assigning unit 715 may assign the shared data D to a terminal apparatus 101-i having a communication strength Sti that is lower than the first threshold and may assign to the terminal apparatus 101-i having the highest communication strength Sti, the same assignment data assigned to the terminal apparatus. For example, the data assigning unit 715 assigns the shared data D to the terminal apparatus 101-4 having a communication strength Sti that is lower than the first threshold and assigns the same assignment data to the terminal apparatus 101-3.

As a result, the assignment data assigned to the terminal apparatus 101-i having a communication strength Sti that is lower than the first threshold can be backed up by the terminal apparatus 101-i with the lowest possibility of deterioration of the communication state. Therefore, even if the communication state deteriorates at the terminal apparatus 101-i having a communication strength Sti that is lower than the first threshold, the possibility of an inability to access the backup data can be reduced as far as possible.

The process assigning unit 713 transmits execution context to the fourth apparatus. For example, the process assigning unit 713 transmits the execution context received by the receiving unit 711 from the slave terminal apparatus T2 to the terminal apparatus 101-i storing the backup data. As a result, the process assigned to the slave terminal apparatus T2 can be reassigned to the terminal apparatus 101-i storing the backup data. Therefore, even if the communication state deteriorates at the slave terminal apparatus T2, the terminal apparatus 101-i storing the backup data can be caused to continue the process.

As described above, the master terminal apparatus T1 of the third embodiment assigns the shared data D to a terminal apparatus 101-i having a communication strength Sti that is lower than the first threshold. The master terminal apparatus T1 assigns to a terminal apparatus 101-i different from the terminal apparatus 101-i , the same assignment data assigned to the terminal apparatus 101-i . As a result, even if the communication state deteriorates at the terminal apparatus 101-i storing the shared data D, the terminal apparatus 101-i executing the process can access the backup data to prevent termination of the process.

In this case, for example, the master terminal apparatus T1 assigns to the terminal apparatus 101-i having a communication strength Sti that is higher than the first threshold, the same assignment data. For example, the master terminal apparatus T1 assigns to any of the terminal apparatuses 101-1 to 101-3 having a communication strength Sti that is higher than the first threshold, the same assignment data assigned to the terminal apparatus 101-4. As a result, the possibility of an inability to access the backup data can be reduced.

The master terminal apparatus T1 may assign the same assignment data to the terminal apparatus 101-i having the largest value of the communication strength Sti. For example, the master terminal apparatus T1 assigns to the terminal apparatus 101-3 having the largest value of the communication strength Sti, the same assignment data assigned to the terminal apparatus 101-4. As a result, the possibility of an inability to access the backup data can further be reduced.

The master terminal apparatus T1 receives information of a process under execution (e.g., execution context) from any of the terminal apparatuses 101-i assigned the process that uses the shared data D. In this case, for example, the master terminal apparatus T1 receives the information of the process under execution from any of the terminal apparatuses 101-i having a communication strength Sti that is lower than the first threshold. Based on the received information of the process under execution, the master terminal apparatus T1 assigns the process under execution to the terminal apparatus 101-i storing the same assignment data. As a result, the load of the network due to access to another terminal apparatus is reduced and even if the communication state deteriorates at the terminal apparatus 101-i having a communication strength Sti that is less than the first threshold, the process using the backup data can be continued and completed.

The functional units (the receiving unit 721 and the executing unit 722) having functions different from the slave terminal apparatus T2 according to the first and second embodiments will be described.

The receiving unit 721 receives the execution context transmitted from the process assigning unit 713. The executing unit 722 executes the process based on the execution context received by the receiving unit 721. As a result, the slave terminal apparatus T2 can continue the process assigned to another slave terminal apparatus T2 in a deteriorated communication state.

As described above, the slave terminal apparatus T2 of the third embodiment executes the process under execution assigned from the master terminal apparatus T1.

Figure 19:
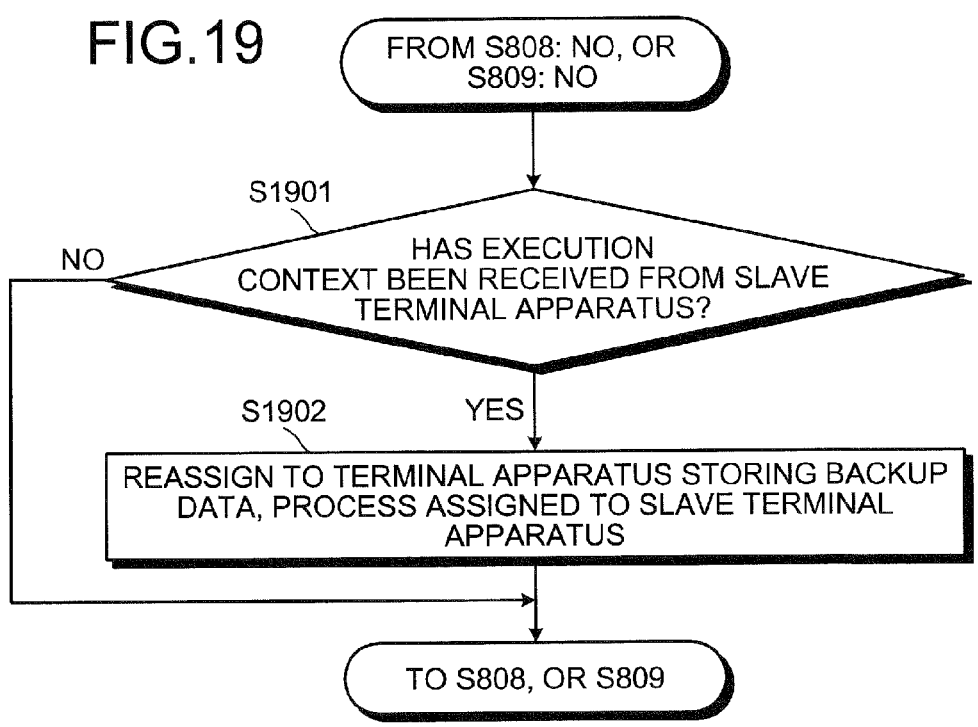
FIG. 19 is a flowchart of an example of a master terminal process procedure of the master terminal apparatus according to the third embodiment.

FIG. 19 is a flowchart of an example of a master terminal process procedure of the master terminal apparatus T1 according to the third embodiment. The master terminal process depicted in FIG. 19 is a process executed by the CPU 301 of the master terminal apparatus T1 if the execution of the process is not completed at step S808 of FIG. 8 (step S808: NO). The master terminal process depicted in FIG. 19 is a process executed by the CPU 301 of the master terminal apparatus T1 if the process result of the assigned process has not been received at step S809 of FIG. 8 (step S809: NO).

In the master terminal process, the master terminal apparatus T1 determines whether the execution context has been received from the slave terminal apparatuses T2 (step S1901). If execution context has been received from the slave terminal apparatuses T2 (step S1901: YES), the master terminal apparatus T1 reassigns to the terminal apparatus 101-i storing the backup data, the process assigned to the slave terminal apparatuses T2 (step S1902). For example, the master terminal apparatus T1 transmits the received execution context to the terminal apparatus 101-3 storing the backup data and thereby, reassigns the assigned process.

After step S1902, the master terminal apparatus T1 proceeds to step S808 or step S809. If the master terminal process is executed after step S808: NO, the master terminal apparatus T1 proceeds to step S808. If the master terminal process is executed after step S809: NO, the master terminal apparatus T1 proceeds to step S809.

If execution context has not been received from the slave terminal apparatuses T2 at step S1901 (step S1901: NO), the master terminal apparatus T1 proceeds to step S808 or step S809. Similarly, if the master terminal process is executed after step S808: NO, the master terminal apparatus T1 proceeds to step S808. If the master terminal process is executed after step S809: NO, the master terminal apparatus T1 proceeds to step S809.

By executing the master terminal process, if execution context has been received from the slave terminal apparatuses T2, the master terminal apparatus T1 reassigns to the terminal apparatus 101-i storing the backup, the process assigned to the slave terminal apparatuses T2. As a result, the terminal apparatus 101-i storing the backup can be caused to take over the process executed by the slave terminal apparatuses T2.

Figure 20:
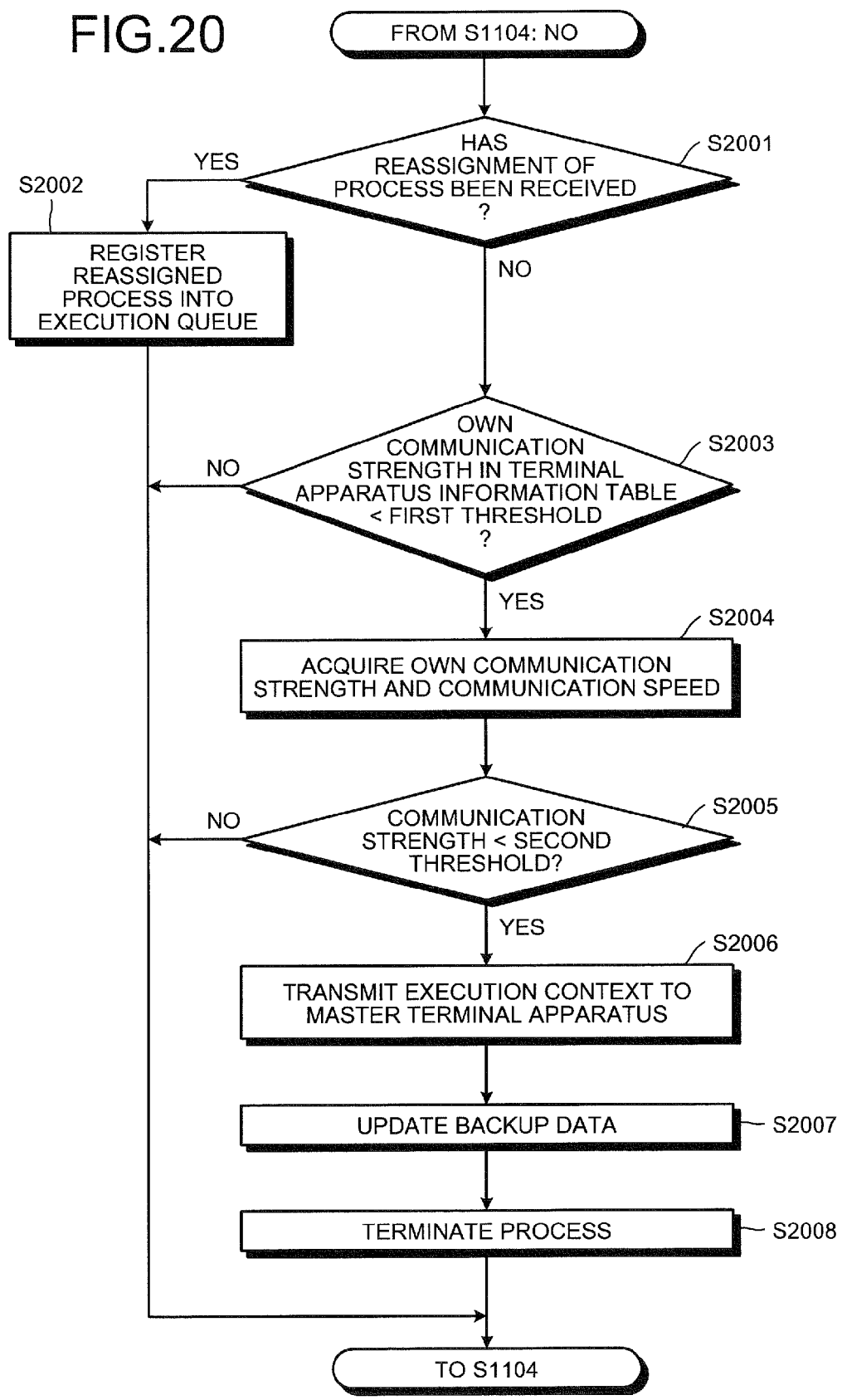
FIG. 20 is a flowchart of an example of a slave executing process procedure of the slave terminal apparatus according to the third embodiment.

FIG. 20 is a flowchart of an example of a slave executing process procedure of the slave terminal apparatus T2 according to the third embodiment. The slave executing process depicted in FIG. 20 is a process executed by the slave terminal apparatus T2 if the execution of the process has not been completed at step S1104 of FIG. 11 (step S1104: NO).

In the slave executing process, the slave terminal apparatus T2 determines whether reassignment of a process has been received from the master terminal apparatus T1 (step S2001). For example, the slave terminal apparatus T2 determines whether execution context has been received from the master terminal apparatus T1 and thereby, determine whether reassignment of a process has been received.

If reassignment of a process has been received from the master terminal apparatus T1 at step S2001 (step S2001:

YES), the slave terminal apparatus T2 registers the reassigned process into an execution queue (step S2002) and proceeds to step S1104.

If reassignment of a process has not been received from the master terminal apparatus T1 at step S2001 (step S2001: NO), the slave terminal apparatus T2 determines whether the communication strength Sti thereof in the terminal apparatus information table 400 is less than the first threshold (step S2003).

In the terminal apparatus information table 400, if the communication strength Sti of the slave terminal apparatus T2 is less than the first threshold at step S2003 (step S2003: YES), the slave terminal apparatus T2 acquires the communication strength Sti and the communication speed Spi of the slave terminal apparatus T2 (step S2004). The slave terminal apparatus T2 determines whether the acquired communication strength Sti is less than the prescribed second threshold (step S2005).

If it is determined at step S2005 that the acquired communication strength Sti is less than the prescribed second threshold (step S2005: YES), the slave terminal apparatus T2 transmits the execution context to the master terminal apparatus T1 (step S2006). The slave terminal apparatus T2 updates the backup data to the assignment data stored at the slave terminal apparatus T2 (step S2007), terminates the process under execution (step S2008), and proceeds to step S1104. At step S2007, the slave terminal apparatus T2 refers to the data assignment table 500 depicted in FIG. 17 to identify the terminal apparatus 101-i storing the backup data. The slave terminal apparatus T2 transmits the stored assignment data to the identified terminal apparatus 101-i to update the backup data. As a result, the terminal apparatus 101-i storing the backup data can be caused to continue the process that uses the latest shared data D.

At step S2003, in the terminal apparatus information table 400, if the communication strength Sti of the slave terminal apparatus T2 is greater than or equal to the first threshold at step S2003 (step S2003: NO), the slave terminal apparatus T2 proceeds to step S1104. If it is determined at step S2005 that the acquired communication strength Sti is greater than or equal to the prescribed second threshold (step S2005: NO), the slave terminal apparatus T2 proceeds to step S1104.

By executing the slave executing process, if the process is reassigned from the master terminal apparatus T1, the slave terminal apparatus T2 can register the reassigned process into the execution queue.

By executing the slave executing process, if the communication strength Sti falls below the second threshold, the slave terminal apparatus T2 transmits the execution context to the master terminal apparatus T1 and updates the backed-up shared data D. As a result, the backing-up terminal apparatus 101-i can be caused to continue the process with consideration of a change in the shared data D due to the process.

FIG. 21 is a flowchart of an example of a reassignment execution process procedure of the slave terminal apparatus T2 according to the third embodiment. The reassignment execution process depicted in FIG. 20 is a process executed by the slave terminal apparatus T2 if the execution of the process has been completed at step S1104 of FIG. 11 (step S1104: YES).

In the reassignment execution process, the slave terminal apparatus T2 determines whether the process reassigned from the master terminal apparatus T1 is registered in the execution queue (step S2101). If the process reassigned from the master terminal apparatus T1 is registered in the execution queue (step S2101: YES), the slave terminal apparatus T2 executes the reassigned process (step S2102).

The slave terminal apparatus T2 determines whether the execution of the reassigned process has been completed (step S2103) and if not (step S2103: NO), the slave terminal apparatus T2 waits until completion. If the execution of the reassigned process has been completed (step S2103: YES), the slave terminal apparatus T2 proceeds to step S1105. At step S2101, if the process reassigned from the master terminal apparatus T1 is not registered in the execution queue at step S2101 (step S2101: NO), the slave terminal apparatus T2 proceeds to step S1105.

By executing the reassignment execution process, the slave terminal apparatus T2 can execute the reassigned process. As a result, the process assigned to the slave terminal apparatus T2 having a communication strength Sti falling below the second threshold can be continued by the terminal apparatus 101-i storing the backup data of the assignment data assigned to the slave terminal apparatus T2. Therefore, the load due to the process and the load of the network due to access between the terminal apparatuses can be distributed until the communication strength Sti falls below the second threshold and the process can be continued to be executed even after the communication strength Sti falls below the second threshold.

According to the scheduling method and the task processing method of the third embodiment described above, data is assigned to a terminal apparatus having a communication strength Sti that is lower than the first threshold and the backup data of the assigned data is assigned to another terminal apparatus. As a result, the load of the network can be distributed until the communication state deteriorates at the terminal apparatus 101-i having a communication strength Sti that is lower than the first threshold and the process can be continued and completed by using the backup data even after the communication state deteriorates.

According to the scheduling method and the task processing method of the third embodiment, the backup data is assigned to a terminal apparatus 101-i having a communication strength Sti that is higher than the first threshold. As a result, the possibility of deterioration of the communication state of the terminal apparatus 101-i storing the backup data can be reduced and the possibility of an inability to access the backup data can be reduced.

According to the scheduling method and the task processing method of the third embodiment, the backup data is assigned to a terminal apparatus 101-i having the highest communication strength Sti. As a result, the possibility of deterioration of the communication state of the terminal apparatus 101-i storing the backup data can further be reduced and the possibility of an inability to access the backup data can be reduced.

According to the scheduling method and the task processing method of the third embodiment, if the communication state deteriorates at the terminal apparatus 101-i executing a process, the process assigned to this terminal apparatus 101-i is reassigned to the terminal apparatus 101-i having the backup data. As a result, the load due to the process can be distributed until the communication state deteriorates at the slave terminal apparatus T2 having a communication strength Sti that is lower than the first threshold. Even after the communication state deteriorates at the terminal apparatus 101-i having a communication strength Sti that is lower than the first threshold, the reassigned terminal apparatus merely has to access the backup data without accessing the data of another terminal apparatus and therefore, can be efficiently caused to execute the reassigned process.

The scheduling method and the task processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

An aspect of the embodiments enables a process to be completed even if the communication state deteriorates among terminal apparatuses sharing data.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduling method that is executed by a first apparatus among a plurality of apparatuses, the scheduling method comprising:
    assigning a process to at least one apparatus among the apparatuses based on a first table that includes each communication strength of the apparatuses;
    receiving an execution result of the process and a communication strength from the at least one apparatus;
    creating the first table based on the received communication strength; and
    determining from among the apparatuses and based on the first table, a second apparatus that is to assign a subsequent process.

2. The scheduling method according to claim 1, wherein the creating includes creating based on the first table, a second table that indicates data assignment to the apparatuses, and
    the scheduling method further comprises notifying the apparatuses of the second table.

3. The scheduling method according to claim 2, wherein the first table includes each communication speed of the apparatuses, and
    the creating the second table includes creating the second table based on each communication speed.

4. The scheduling method according to claim 2, further comprising
    assigning data to at least one apparatus among the apparatuses, when the second table has changed, the data being assigned based on the changed second table.

5. The scheduling method according to claim 1, wherein the assigning includes assigning a process to a third apparatus that is among the apparatuses, when communication strength of the third apparatus is at least equal to a first threshold, and
    the scheduling method further comprises refraining from assigning a process to the third apparatus when the communication strength is smaller than the first threshold.

6. The scheduling method according to claim 1, wherein the assigning includes assigning a process to a third apparatus that is among the apparatuses, when communication strength of the third apparatus is less than a first threshold, and
    the receiving includes receiving from the third apparatus and based on a change in the communication strength of the third apparatus, execution context of the process.

7. The scheduling method according to claim 6, wherein the assigning of the process includes refraining from assigning the process to the third apparatus, and
    the scheduling method further comprises executing the process based on the execution context.

8. The scheduling method according to claim 6, wherein the assigning of the process includes assigning data to a fourth apparatus among the apparatuses, and
    the scheduling method further comprises transmitting the execution context to the fourth apparatus.

9. The scheduling method according to claim 8, wherein communication strength of the fourth apparatus is at least equal to the first threshold.

10. The scheduling method according to claim 5, wherein the receiving includes receiving the communication strength of the third apparatus at a predetermined cycle.

* * * * *